(12) United States Patent
Touyama

(10) Patent No.: US 11,328,716 B2
(45) Date of Patent: May 10, 2022

(54) INFORMATION PROCESSING DEVICE, INFORMATION PROCESSING SYSTEM, AND INFORMATION PROCESSING METHOD, AND PROGRAM

(71) Applicant: SONY CORPORATION, Tokyo (JP)

(72) Inventor: Keisuke Touyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 210 days.

(21) Appl. No.: 16/477,289

(22) PCT Filed: Oct. 5, 2018

(86) PCT No.: PCT/JP2018/037347
§ 371 (c)(1),
(2) Date: Jul. 11, 2019

(87) PCT Pub. No.: WO2019/123775
PCT Pub. Date: Jun. 27, 2019

(65) Prior Publication Data
US 2019/0378508 A1    Dec. 12, 2019

(30) Foreign Application Priority Data

Dec. 22, 2017  (JP) .............................. JP2017-245693

(51) Int. Cl.
*G10L 15/22* (2006.01)
*G06K 9/00* (2022.01)
*G10L 15/18* (2013.01)

(52) U.S. Cl.
CPC .......... *G10L 15/22* (2013.01); *G06K 9/00362* (2013.01); *G10L 15/1815* (2013.01); *G10L 2015/223* (2013.01)

(58) Field of Classification Search
CPC .......... G10L 15/1815; G10L 15/22–2015/228; G10L 15/00–1534; G06K 9/00362
(Continued)

(56) References Cited

U.S. PATENT DOCUMENTS 5,918,222 A *  6/1999 Fukui .................... G06Q 10/10
6,961,705 B2 * 11/2005 Aoyagi .................... G06F 3/16
                                                          704/270
(Continued)

FOREIGN PATENT DOCUMENTS

JP        2011-054088 A    3/2011

*Primary Examiner* — Abul K Azad
(74) *Attorney, Agent, or Firm* — Paratus Law Group, PLLC

(57) ABSTRACT

When a confirmation response to a user speech is generated, a confirmation response capable of reducing a possibility of the occurrence of misunderstanding by adding additional information acquired from dictionary data or an application execution results is generated. Provided is an information processing device including an audio input unit that receives a user speech, a confirmation response generating unit that generates a confirmation response for requesting confirmation of a speaking user to the user speech, and an audio output unit that outputs the confirmation response generated by the confirmation response generating unit, in which the confirmation response generating unit executes generation of a confirmation response using additional information acquired from at least any of dictionary data and an application execution result. For example, the confirmation response is generated using general knowledge base dictionary data, an application execution result, or information obtained from a captured image, a sensor, or the like.

21 Claims, 22 Drawing Sheets

(58) Field of Classification Search
USPC .......................................................... 704/275
See application file for complete search history.

(56) References Cited

U.S. PATENT DOCUMENTS

| | | | | |
|---|---|---|---|---|
| 9,026,441 | B2* | 5/2015 | Ehsani | G10L 17/22 |
| | | | | 704/244 |
| 10,089,981 | B1* | 10/2018 | Elangovan | H04M 1/271 |
| 2003/0105634 | A1* | 6/2003 | Abella | H04M 3/4936 |
| | | | | 704/257 |
| 2011/0282673 | A1* | 11/2011 | Di Profio | H04N 5/4403 |
| | | | | 704/275 |
| 2014/0278413 | A1* | 9/2014 | Pitschel | G10L 15/22 |
| | | | | 704/243 |
| 2015/0066479 | A1* | 3/2015 | Pasupalak | G06F 40/40 |
| | | | | 704/9 |
| 2017/0084271 | A1* | 3/2017 | Nakadai | G06F 3/16 |
| 2018/0218293 | A1* | 8/2018 | Schlesinger | G06Q 10/025 |
| 2018/0285752 | A1* | 10/2018 | Yu | G10L 13/00 |
| 2021/0104238 | A1* | 4/2021 | D'Souza | G10L 15/22 |

* cited by examiner

FIG. 3

(101) CONFIRMATION RESPONSE GENERATION EXAMPLE 101

| USER SPEECH | "PLEASE REGISTER SHOPPING SCHEDULE IN 8-TH (YO-KA)?" |
|---|---|
| CONFIRMATION RESPONSE OF DEVICE | "DO YOU WANT TO REGISTER SHOPPING SCHEDULE IN 8-TH (HACHINICHI)?" |

(102) CONFIRMATION RESPONSE GENERATION EXAMPLE 102

| USER SPEECH | "PLEASE REGISTER SHOPPING SCHEDULE IN 8-TH (YO-KA)?" |
|---|---|
| CONFIRMATION RESPONSE OF DEVICE | "IS IT 8-TH (YO-KA), NEXT WEDNESDAY?" |

(103) CONFIRMATION RESPONSE GENERATION EXAMPLE 103

| USER SPEECH | "PLEASE REGISTER SHOPPING SCHEDULE IN DAY AFTER THREE DAYS" |
|---|---|
| CONFIRMATION RESPONSE OF DEVICE | "IS IT 11-TH, THURSDAY?" |

FIG. 4

(104) CONFIRMATION RESPONSE GENERATION EXAMPLE 104

| USER SPEECH | "PLEASE LET ME KNOW HOW TO GET TO KINKAKUJI?" |
|---|---|
| CONFIRMATION RESPONSE OF DEVICE | "DO YOU MEAN KINKAKUJI MADE BY ASHIKAGA YOSHIMITSU?" |

(105) CONFIRMATION RESPONSE GENERATION EXAMPLE 105

| USER SPEECH | "PLEASE RECORD "ONE CHANNEL (ICCHANNERU)" FROM 5 O'CLOCK?" |
|---|---|
| CONFIRMATION RESPONSE OF DEVICE | "DO YOU LIKE TO GO WITH XYZ TELEVISION?" |

FIG. 6

(201) CONFIRMATION RESPONSE GENERATION EXAMPLE 201

| USER SPEECH | "PLEASE REGISTER SHOPPING SCHEDULE IN 10-TH?" |
|---|---|
| CONFIRMATION RESPONSE OF DEVICE | "IT IS 10-TH, AND IT IS DAY TO GO TO CONCERT?" |

(202) CONFIRMATION RESPONSE GENERATION EXAMPLE 202

| USER SPEECH | "PLEASE LET ME KNOW HOW TO GET TO GINKAKUJI?" |
|---|---|
| CONFIRMATION RESPONSE OF DEVICE | "DO YOU MEAN KINKAKUJI YOU VISITED IN LAST AUGUST?" |

FIG. 7

(203) CONFIRMATION RESPONSE GENERATION EXAMPLE 203

| USER SPEECH | "PLEASE REGISTER BARBECUE WITH MR. SATO FAMILY" |
|---|---|
| CONFIRMATION RESPONSE OF DEVICE | "DO YOU MEAN MR. SATO AT OPPOSITE SIDE?" |

(204) CONFIRMATION RESPONSE GENERATION EXAMPLE 204

| USER SPEECH | "PLEASE REGISTER BARBECUE WITH MR. SATO FAMILY" |
|---|---|
| CONFIRMATION RESPONSE OF DEVICE | "DO YOU MEAN YOUR NEIGHBOR, MR. SATO?" |

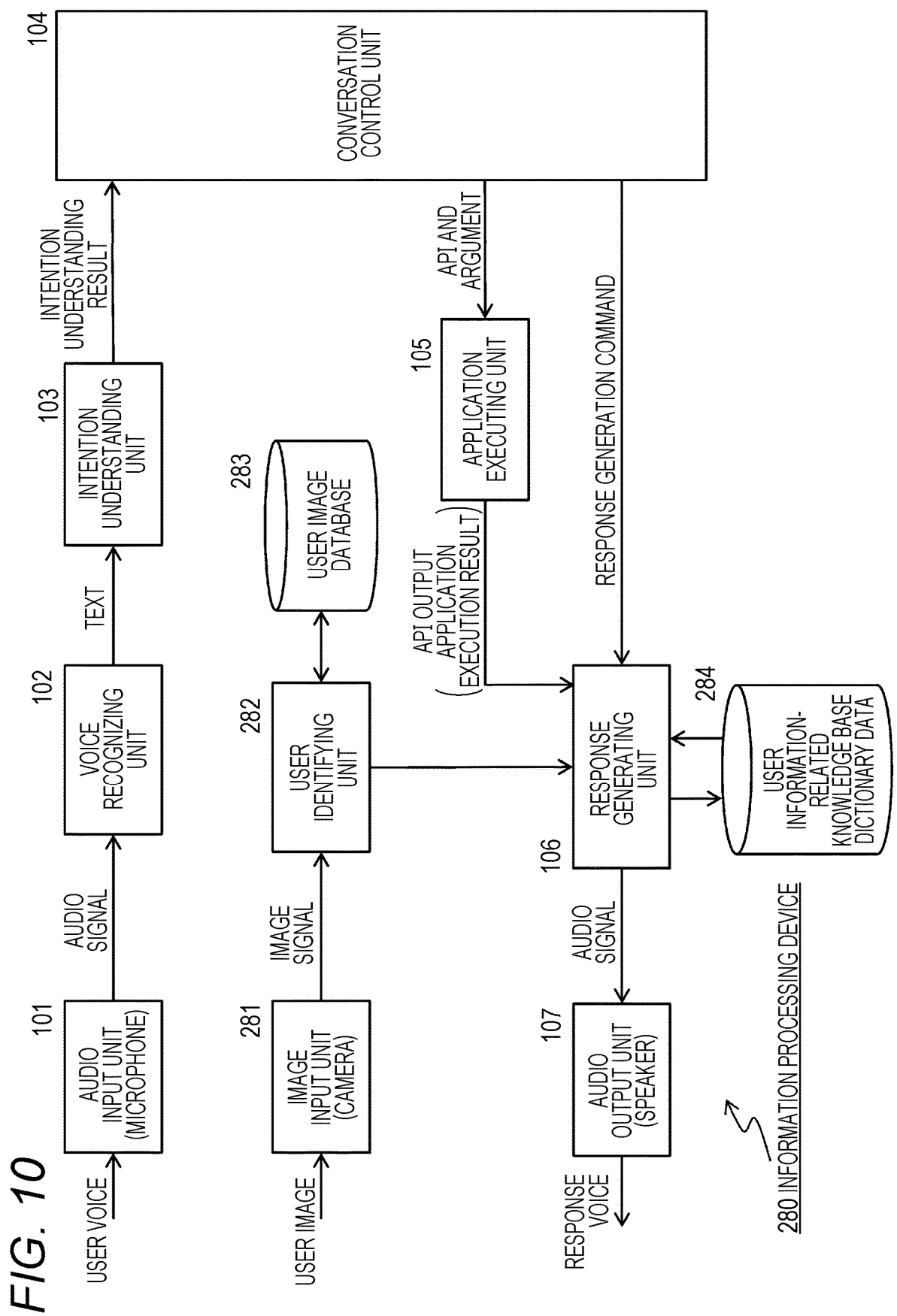

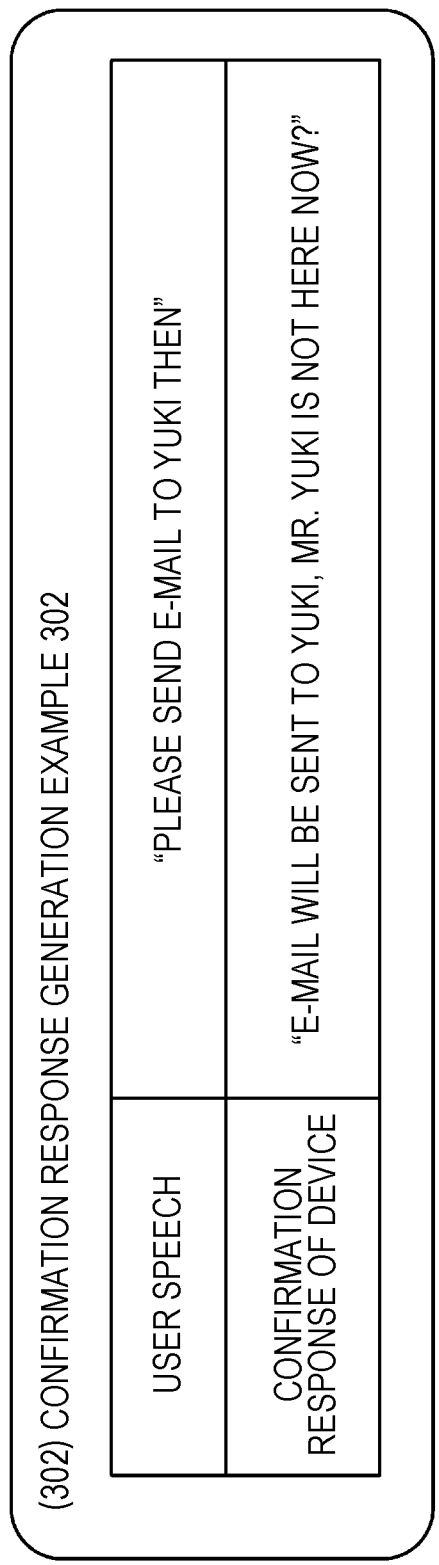

FIG. 12

(303) CONFIRMATION RESPONSE GENERATION EXAMPLE 303

| USER SPEECH | "PLEASE LET ME KNOW HOW TO GET TO KINKAKUJI" |
|---|---|
| CONFIRMATION RESPONSE OF DEVICE | "DO YOU MEAN KINKAKUJI SHINNING IN GOLDEN BROWN" |

(304) CONFIRMATION RESPONSE GENERATION EXAMPLE 304

| USER SPEECH | "REGISTER SCHEDULE OF GOING OUT IN 10-TH" |
|---|---|
| CONFIRMATION RESPONSE OF DEVICE | "DO YOU MEAN FLAG HOLIDAY OF 10-TH?" |

(305) CONFIRMATION RESPONSE GENERATION EXAMPLE 305

| USER SPEECH | "PLEASE CALL SCHOOL" |
|---|---|
| CONFIRMATION RESPONSE OF DEVICE | "YOU MEAN SHINAGAWA JUNIOR HIGH SCHOOL" |

FIG. 13

(306) CONFIRMATION RESPONSE GENERATION EXAMPLE 306

| USER SPEECH | "PLEASE LET ME KNOW ROAD CONDITIONS TO GRANDMOTHER'S HOUSE" |
|---|---|
| CONFIRMATION RESPONSE OF DEVICE | "YOU MEAN HOUSE OF MRS. △△ (USER'S GRANDMOTHER)?" |

(307) CONFIRMATION RESPONSE GENERATION EXAMPLE 307

| USER SPEECH | "PLEASE LET ME KNOW ROAD CONDITIONS TO GRANDMOTHER'S HOUSE" |
|---|---|
| CONFIRMATION RESPONSE OF DEVICE | "YOU MEAN HOUSE OF MRS. ○○ (USER'S MOTHER. GRANDMOTHER TO USER'S CHILDREN)?" |

INFORMATION PROCESSING DEVICE, INFORMATION PROCESSING SYSTEM, AND INFORMATION PROCESSING METHOD, AND PROGRAM

CROSS REFERENCE TO PRIOR APPLICATION

This application is a National Stage Patent Application of PCT International Patent Application No. PCT/JP2018/037347 (filed on Oct. 5, 2018) under 35 U.S.C. § 371, which claims priority to Japanese Patent Application No. 2017-245693 (filed on Dec. 22, 2017), which are all hereby incorporated by reference in their entirety.

TECHNICAL FIELD

The present disclosure relates to an information processing device, an information processing system, and an information processing method, and a program. More specifically the present invention relates to an information processing device, an information processing system, and an information processing method, and a program in which a response is given on the basis of a voice recognition result of a user speech.

BACKGROUND ART

Recently, the use of a conversation system that performs voice recognition of a user speech and gives a response on the basis of a recognition result is increasing.

In this conversation system, for example, the system recognizes and understands a user speech input via a microphone and performs a corresponding process.

For example, in a case in which the user speaks "Let me know tomorrow weather", a process of acquiring weather information from a weather information provision server, generating a response based on the acquired information, and outputting the response from the speaker is performed. Alternatively, in a case in which the user speaks "Turn off television," an operation of turning off the television is performed.

However, in such a conversation system, there are cases in which the system is unable to uniquely decide an action, for example, in a case in which reliability of a voice recognition result or an intention estimation result of a user speech is low, in a case in which there are a plurality of interpretations of a recognition result, or the like.

In such a case, the system may generate a confirmation response for confirming a user intention and output the confirmation response to the user.

Further, in a case in which a process with a high risk in the case of failure is performed such as registration or deletion of data stored in a storage unit of the system, for example, the system may output a confirmation response for reconfirming whether or not a process is performed to the user.

For example, Patent Document 1 (Japanese Patent Application Laid-Open No. 2011-54088) discloses the following configuration.

A configuration in which, in a case in which a user speech which is likely to be misheard, for example, (Example 1) "get a cup" and "put a cut" or (Example 2) "Tell me about Ginkakuji" and "Tell me about Kinkakuji", a response for confirming an intention of a user is output is disclosed.

Patent Document 1 further describes the following example as an example in which there are a plurality of action targets, and an intended action target is unable to be decided.

(Example 3) "Take a cup"

In a case in which the user speech of (Example 3) can be recognized, but there are a plurality of cups, an intended cup is unable to be understood. Even in such a case, a response for confirming the intention of the user is output.

Patent Document 1 discloses such a conversation type confirmation configuration.

The confirmation response which is generated and output by the system in the case of (Example 2) disclosed in Patent Document 1 is the following response:

User: "Tell me about Ginkakuji (unclear pronunciation)"

System: "Do you want to go with. Ginkakuji?"

In this example of the related art, a parrot-like response sentence using only the word "Ginkakuji" is output in response to the user speech.

Here, if a case in which the response of the system is transferred to the user by voice is considered, in a case in which the response of the system is difficult to hear due to some reasons, the user may mishear as "Kinkakuji" though the system speaks "Ginkakuji". Further, even when a response output including not only voice but also some screen display or the like is performed, in a case in which the user understands Kinkakuji and Ginkakuji conversely by mistake or the like, only information different from an intention of the user is finally obtained since the user is understood to express an intention to desire information of Kinkakuji even in a case in which the user desires information about Ginkakuji originally.

CITATION LIST

Patent Document

Patent Document 1: Japanese Patent Application Laid-Open No. 2011-54088

SUMMARY OF THE INVENTION

Problems to be Solved by the Invention

As described above, in the existing conversation system, in a case in which the reliability of the voice recognition result or the intention estimation result of the system for the user speech is low, in a case in Which there are a plurality of interpretations of a recognition result, or the like, the confirmation response may be output to the user. However, at this time, there is a problem in that it is a technique of repeating the speech of the user without change, and in a case in which the user is likely to mishear further or is misunderstanding, it is unable to be corrected, and information different from information or desired by the user is provided.

The present disclosure was made in light of the above problems, and it is an object of the present disclosure to provide an information processing device, an information processing system, and an information processing method, and a program which are capable of improving confirmation accuracy by giving a response including information when a system presents a confirmation response for disambiguation to the user in a case in which a system side is unable to decide a process, for example, in a case in which a recognition result of a user speech is ambiguous, in a case in which there are a plurality of candidates, or the like.

Solutions to Problems

According to a first aspect of the present disclosure, provided is an information processing device including an audio input unit that receives a user speech, a confirmation response generating unite, that generates a confirmation response for requesting confirmation of a speaking user to the user speech, and an audio output unit that outputs the confirmation response generated by the confirmation response generating unit, in which the confirmation response generating unit executes generation of a confirmation response using additional information acquired from at least any of dictionary data and an application execution result.

Further, according to a second aspect of the present disclosure, provided is an information processing system including a user terminal and a data processing server, in which the user terminal includes an audio input unit that receives a user speech, a confirmation response generating unit that generates a confirmation response for requesting confirmation of a speaking user to the user speech, and an audio output unit that outputs the confirmation response generated by the confirmation response generating unit, the data processing server includes a voice recognizing unit that executes a recognition process of an input audio of the audio input unit, an intention understanding unit that executes an intention understanding process based on a recognition result of the voice recognizing unit, and a conversation control unit that executes a conversation control process based on an intention understanding result generated by the intention understanding unit, determines whether or not a confirmation response to the user speech is necessary on the basis of the intention understanding result, and outputs a confirmation response generation command to the confirmation response generating unit of the user terminal in a case in which it is determined that the confirmation response is necessary, and the confirmation response generating unit of the user terminal executes generation of a confirmation response using additional information acquired from at least any of dictionary data and an application execution result in accordance with an input of the confirmation response generation command from the data processing server.

Further, according to a third aspect of the present disclosure, provided is an information processing method executed in an information processing device including an audio input, step of receiving, by an audio input unit, a user speech, a confirmation response generation step of generating, by a confirmation response generating unit, a confirmation response for requesting confirmation of a speaking user to the user speech, and an audio output step of outputting, by an audio output unit, the confirmation response generated in the confirmation response generation step, in which, in the confirmation response generation step, generation of a confirmation response using additional information acquired from at least any of dictionary data and an application execution result is executed.

Further, according to a fourth aspect of the present disclosure, provided is an information processing method executed in an information processing system including a user terminal and a data processing server including executing, by the user terminal, an audio input process of receiving a user speech, executing, by the data processing server, an audio recognition process of an input voice input in the audio input process, executing, by the data processing server, an intention understanding process based on a voice recognition result generated in the voice recognition process, determining, by the data processing server, whether or not a confirmation response to the user speech is necessary on the basis of an intention understanding result of the intention understanding process, and outputting a confirmation response generation command to the user terminal in a case in which it is determined that the confirmation response is necessary, and executing, by the user terminal, a confirmation response generation process of generating a confirmation response for requesting confirmation of a speaking user to the user speech in accordance with an input of the confirmation response generation command from the data processing server, in which, in the confirmation response generation process, a confirmation response generation process using additional information obtained from at least any of dictionary data and an application execution result is executed.

Further, according to a fifth aspect of the present disclosure, provided is a program causing information processing to be executed in an information processing device including an audio input step of causing an audio input unit to receive a user speech, a confirmation response generation step of causing a confirmation response generating unit to generate a confirmation response for requesting confirmation of a speaking user to the user speech, and an audio output step of causing an audio output unit to output the confirmation response, in which, in the confirmation response generation step, generation of a confirmation response using additional information acquired from at least any of dictionary data and an application execution result is executed.

Incidentally, a program of the present disclosure is, for example, a program that can be provided by a computer readable storage medium or a communication medium which is provided to an information processing device or a computer system capable of executing various program codes in a computer readable format. As such a program is provided in a computer readable format, a process corresponding to the program can be realized in an information processing device or a computer system.

Further objects, features, and advantages of the present disclosure will become apparent from embodiments of the present disclosure to be described later or detailed description based on the attached drawings. Incidentally, in this specification, a term "system" refers to a logical aggregate configuration of a plurality of devices, and the devices of the respective configurations need not necessarily be installed in a same housing.

Effects of the Invention

According to a configuration of one embodiment of the present disclosure, a configuration in which, when a confirmation response to a user speech is generated, a confirmation response capable of reducing a possibility of the occurrence of misunderstanding by adding additional information acquired from dictionary data or an application execution results is generated is implemented.

Specifically, for example, provided is an information processing device including an audio input unit that receives a user speech, a confirmation response generating unit that generates a confirmation response for requesting confirmation of a speaking user to the user speech, and an audio output unit that outputs the confirmation response generated by the confirmation response generating unit, in which the confirmation response generating unit executes generation of the confirmation response using additional information acquired from at least any of dictionary data and an application execution result. For example, the confirmation response is generated using general knowledge base dictionary data, an application execution result, or information obtained from a captured image, a sensor, or the like.

With this configuration, a configuration in which, when a confirmation response to a user speech is generated, a confirmation response capable of reducing a possibility of the occurrence of misunderstanding by adding additional information acquired from dictionary data or an application execution results is generated is implemented.

Incidentally, the effects described in this specification are merely examples and are not limited, and additional effects may be included.

BRIEF DESCRIPTION OF DRAWINGS

FIG. 3 is a diagram for describing a confirmation response generation example to which the information processing device 220 of the first embodiment is applied.

FIG. 4 is a diagram for describing a confirmation response generation example to which the information processing device 220 of the first embodiment is applied.

FIG. 6 is a diagram for describing a confirmation response generation example to which the information processing device 240 of the second embodiment is applied.

FIG. 7 is a diagram for describing a confirmation response generation example to which the information processing device 240 of the second embodiment is applied.

FIG. 10 is a diagram illustrating a configuration example of an information processing device 280 which is a modified example of the third embodiment.

FIG. 11 is a diagram for describing a confirmation response generation example to which the information processing device 280 which is the modified example of the third embodiment is applied.

FIG. 12 is a diagram for describing a confirmation response generation example to which the information processing device 280 which is the modified example of the third embodiment is applied.

FIG. 13 is a diagram for describing a confirmation response generation example to which the information processing device 280 which is the modified example of the third embodiment is applied.

MODE FOR CARRYING OUT THE INVENTION

Figure 1:
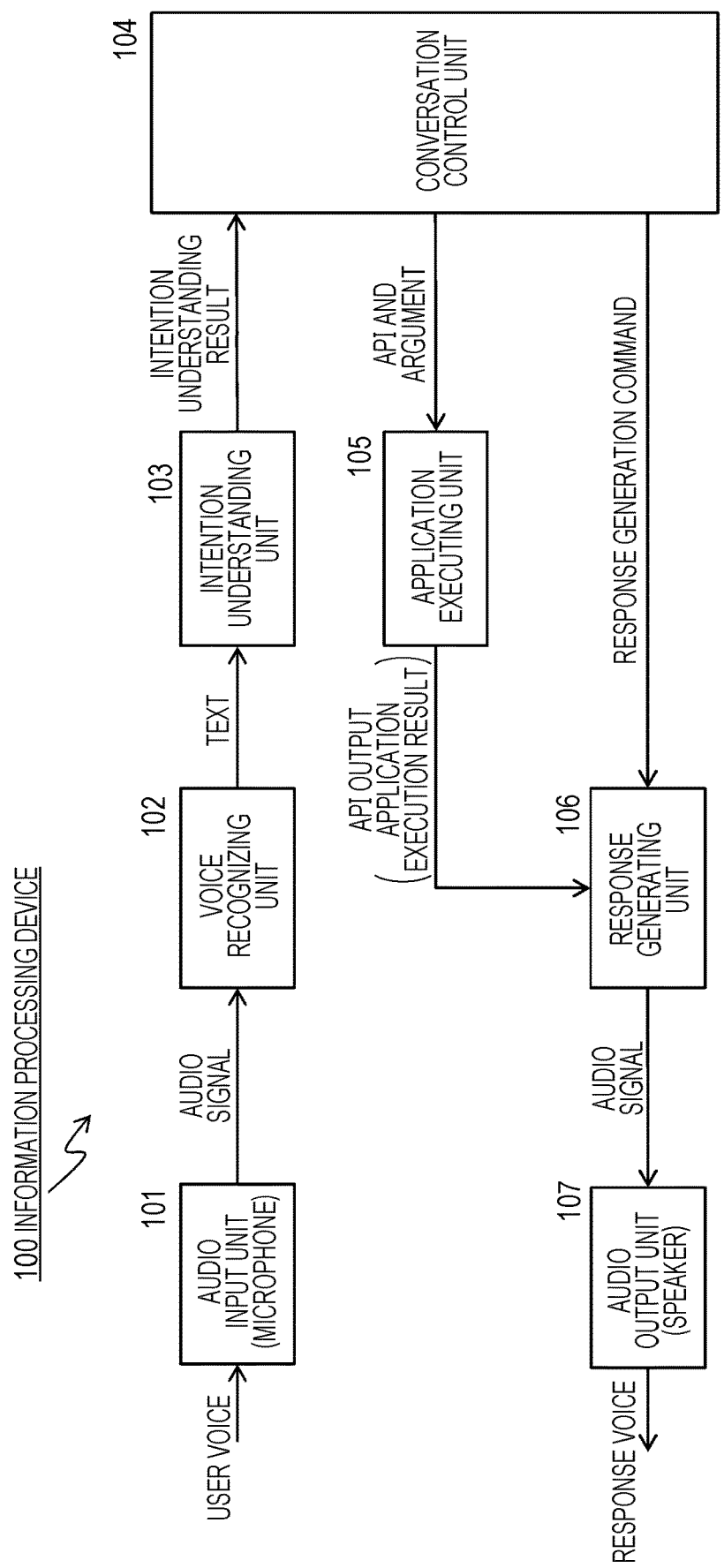
FIG. 1 is a diagram for describing a general configuration example of an information processing device that recognizes a user speech and gives a response.

An information processing device, an information processing system, and an information, processing method, and a program of the present disclosure will be described below in detail with reference to the appended drawings. Incidentally, the description will proceed in accordance with the following items.

1. General configuration example of information processing device that recognizes user speech and gives response or performs process
2. (First embodiment) Embodiment in which response generating unit generates confirmation response using general knowledge base dictionary data
3. (Second embodiment) Embodiment in which response generating unit generates confirmation response using application executing unit
4. (Third embodiment) Embodiment in which response generating unit generates confirmation response using information of information input unit
5. (Fourth embodiment) Embodiment in which output of image or control signal is performed along with audio output.
6. (Fifth embodiment) Embodiment in which confirmation response is generated on the basis of conversation history
7. Configuration example of information processing device and information processing system
8. Hardware configuration example of information processing device
9. Conclusion of configuration of the present disclosure

1. General Configuration Example of Information Processing Device that Recognizes User Speech and Gives Response or Performs Process First, a General Configuration Example of an Information processing device that recognizes a user speech and gives a response or performs a process will be described with reference to FIG. 1.

FIG. 1 is a diagram illustrating a general configuration example of an information processing device 100 that recognizes a user speech and gives a response.

As illustrated an FIG. 1, the information processing device 100 includes an audio input unit (microphone) 101, a voice recognizing unit 102, an intention understanding unit 103, a conversation control unit 104, an application executing unit 105, a response generating unit 106, an audio output unit (speaker) 107.

A user speech voice input from the audio input unit (microphone) 101 is converted from voice data to text data in the voice recognizing unit 102.

The voice recognizing unit 102 has, for example, an automatic speech recognition (ASR) function, and converts voice data into text data including a plurality of Words.

The text data generated in the voice recognizing unit 102 is input to the intention understanding unit 103.

The intention understanding unit 103 selects and outputs an intention candidate of the user included in the text.

For example, the intention understanding unit 103 has a natural language recognition function such as natural language understanding (NLU), and selects a candidate (intent) of the user speech from the text data.

The intention understanding result generated by the intention understanding unit 103 is input to the conversation control unit 104.

The conversation control unit 104 receives the intention understanding result generated by the intention understanding unit 103, and estimates a current conversation state from, for example, a past conversation history or the like and decides an API to be called and an argument thereof in order to execute a process necessary for response generation.

Specifically, it is, for example, a process of activating an application capable of acquiring weather information in a case in which an intention understanding result indicating that the user speech is a "speech or inquiring about weather of Tokyo" is obtained as an intention understanding result generated by the intention understanding unit 103, transferring Tokyo (argument) to the application, and causing the application to acquire information (the weather of Tokyo) necessary for a response.

The API call and the argument information by the conversation control unit 104 are output to the application executing unit 105, the application corresponding to the API call is executed, and API output corresponding to the argument, that is, data necessary for a response process is output to the response generating unit 106.

The response generating unit 106 receives the API output input from the application executing unit 105, that is, the data necessary for the response process and generates voice data to be output as a response.

The response generating unit 106 converts the text data constituting the response data into the voice data on the basis of a text to speech (TTS) function.

The voice data generated by the response generating unit 106 is output toward the user via the audio output unit (speaker) 107.

The above-described process sequence is a process in a case in which the text conversion in the voice recognizing unit 102 and the intention understanding in the intention understanding unit 103 which are based on the user speech are performed without problems and is an example in which a correct response corresponding to the intention of the user is output.

However, There are cases in which the text conversion in the voice recognizing unit 102 and the intention understanding in intention understanding unit 103 which are based on the user speech are difficult.

In such a case, the conversation control unit 104 outputs to the response generating unit 106 a generation command of a confirmation response for requesting confirmation of a speaking user to the user speech, that is, a "confirmation response generation command", and the response, generating unit 106 requests the user to perform a speech for confirmation again.

In other words, in a case in which certainty of recognition or understanding of the user speech is low, a response sentence for requesting the user to confirm content thereof may be generated and presented.

Incidentally, attribute information indicating the reliability is added to text conversion data in the voice recognizing unit 102 or intention understanding result data in the intention understanding unit 103, and the resulting data is input to the conversation control unit 104, and the conversation control unit 104 can determine the reliability on the basis of the attribute information.

Further, for example, in a case in which an important process is performed, for example, in a case in which the speech of the user activates a schedule recording application and requests a process of registering a schedule or a process of deleting a schedule, in a case in which it is necessary to change a schedule record database, or the like, a response sentence for confirming whether or not the process is performed may be output.

A specific processing example in a case in which the information processing device 100 gives a confirmation response for confirming the intention of the user will be described below.

For example, it is assumed that the following "speech of user" is performed:

User speech: "Please register shopping schedule in 8-th (Yo-ka)?"

If such a user speech is input, the information processing device 100 is unable to determine whether "Yo-ka" intends "8-th (Yo-ka)" or whether the user speaks while intending "4-th (Yokka)".

Therefore, the information processing device 100 outputs the following confirmation response for requesting confirmation from the user.

Confirmation Response of device: "Is it 8-th (Yo-ka)?"

This example is an example in a case in which recognition understanding certainty of the device side is low about date information (8-th) spoken by the user.

Such a confirmation response is often performed in the device of the related art.

In the above confirmation response, the speech information ("8-th (Yo-ka)") of the user is used for the response without change. In a case in which such a response is given, the following problems may occur:

(a) if the device outputs a voice response via a speaker, the user is likely to mishear "8-th" as "4-th"; and (b) a true intention of the user is not an 8-th, but the user spoke an 8-th due to some mistake (for example, a schedule was desired to be registered in Wednesday, but the user thought that Wednesday was an 8-th but it was actually a 7-th, or the like), the mistake is unable to be noticed.

As described above, most of the devices of the related art are configured to "parrot" the user speech without change when the confirmation response for requesting the confirmation of the user speech is output.

This technique has a problem in that in a case in which the user is likely to mishear further or is misunderstanding, it is unable to be corrected, and information different from information originally desired by the user is provided.

The information processing device of the present disclosure has a configuration for solving such problems.

In other words, in a case in which the recognition result of the user speech is ambiguous or there are a plurality of candidates, it is possible to improve the confirmation accuracy by adding information when the system presents the confirmation response for disambiguation to the user.

Specifically, for example, the confirmation response is generated using additional information obtained from at least any of dictionary data and an application execution result.

A specific example of a configuration and a process of the information processing device of the present disclosure will be described below.

2. (First Embodiment) Embodiment in which Response Generating Unit Generates Confirmation Response Using General Knowledge Base Dictionary Data First, an embodiment in which the response generating unit generates the confirmation response using general knowledge base dictionary data will be described as a first embodiment.

Figure 2:
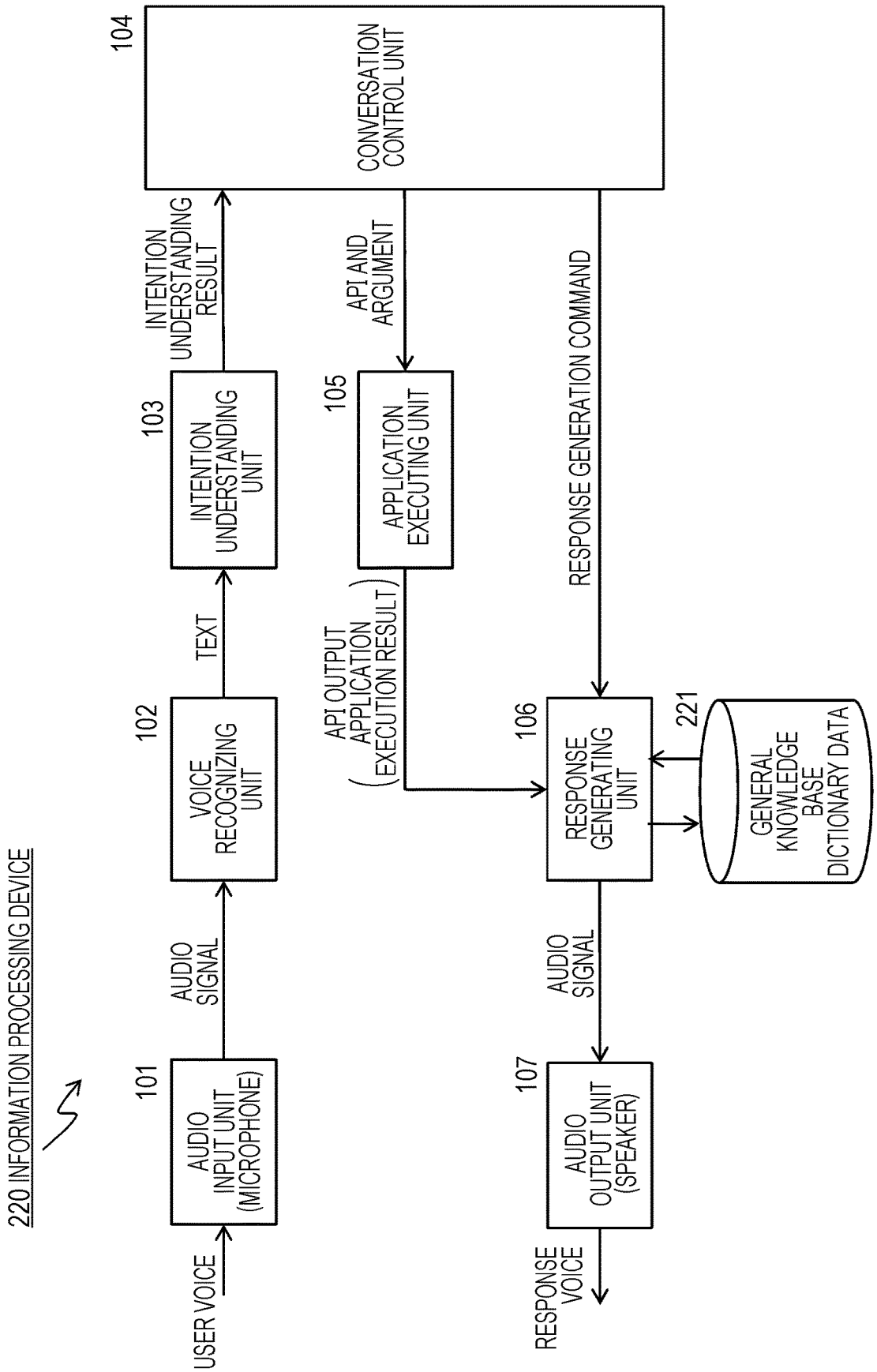
FIG. 2 is a diagram illustrating a configuration example of an information processing device 220 of a first embodiment.

FIG. 2 is a diagram illustrating a configuration example of an information processing device 220 of the present first embodiment.

As illustrated in FIG. 2, the information processing device 220 includes an audio input unit (microphone) 101, a voice recognizing unit 102, an intention understanding unit 103, a conversation control unit 104, an application executing unit 105, a response generating unit 106, and an audio output unit (speaker) 107, and further includes a general knowledge base dictionary data 221 used for response generation by the response generating unit 106.

The components such as the audio input unit (microphone) 101, the voice recognizing unit 102, the intention understanding unit 103, the conversation control unit 104, the application executing unit 105, the response generating unit 106, and the audio output unit (speaker) 107 basically perform the processes described above with reference to FIG. 1.

In other words, a user speech voice input from the audio input unit (microphone) 101 is converted from voice data to text data in the voice recognizing unit 102.

The voice recognizing unit 102 has, for example, an automatic speech recognition (ASR) function, and converts the voice data into the text data including a plurality of words.

The text data generated in the voice recognizing unit. 102 is input to the intention understanding unit 103.

The intention understanding unit 103 selects and outputs an intention candidate of the user included in the text.

For example, the intention understanding unit 103 has a natural language recognition function such as natural language understanding (NLU), and selects a candidate (intent) of the user speech from the text data.

The intention understanding result generated by the intention understanding unit 103 is input to the conversation control unit 104.

The conversation control unit 104 receives the intention understanding result generated by the intention understanding unit 103, and estimates a current conversation state from, for example, a past conversation history or the like and decides an API to be called and an argument thereof in order to execute a process necessary for response generation.

The API call and the argument information by the conversation control unit 104 are output to the application executing unit 105, the application corresponding to the API call is executed, and API output corresponding to the argument, that is, data necessary for a response process is output to the response generating unit 106.

The response generating unit 106 receives the API output input from the application executing unit 105, that is, the data necessary for the response process and generates voice data to be output as a response.

The response generating unit 106 converts the text data constituting the response data into the voice data on the basis of a text to speech (TTS) function.

The voice data generated by the response generating unit 106 is output toward the user via the audio output unit (speaker) 107.

The above-described process sequence is a process similar to the process sequence described above with reference to FIG. 1.

In other words, the above-described process sequence is a process in a case in which the text conversion in the voice recognizing unit 102 and the intention understanding in the intention understanding unit 103 which are based on the user speech are performed without problems and is an example in which a correct response corresponding to the intention of the user is output.

The conversation control unit 104 requests the response generating unit 106 to generate and output the confirmation response in a case in which the reliability of the text conversion in the voice recognizing unit 102 and the intention understanding in the intention understanding unit 103 which are based on the user speech is low or in a case in which the speech of the user is an important process such as a schedule setting.

In the present first embodiment, the confirmation response generation process executed by the response generating unit 106 is different from the process described above with reference to FIG. 1.

In the confirmation response described above with reference to FIG. 1, a confirmation response of parroting "Is it 8-th (Yo-ka)?" is given as the confirmation response of the device for confirming whether the intention of the user is "8-th (Yo-ka)" or "4-th (Yokka)" with respect to the user speech:

User speech: "Please register shopping schedule in 8-th (Yo-ka)?"

In this case, as described above, the following problems occur:

(a) if the device outputs a voice response via a speaker, the user is likely to mishear "8-th" as "4-th"; and (b) a true intention of the user is not an 8-th, but the user spoke an 8-th due to some mistake (for example, a schedule was desired to be registered in Wednesday, but the user thought that Wednesday was an 8-th but it was actually a 7-th, or the like), the mistake is unable to be noticed.

The response generating unit 106 of the information processing device 220 of the present disclosure illustrated in FIG. 2 generates the confirmation response, that is, the confirmation response for requesting the confirmation of a speaking user to the user speech using the general knowledge base dictionary data 221 in order to reduce the occurrence of such problems.

Incidentally, the general knowledge base dictionary data 221 is databased data in which various facts or common knowledge such as common sense, customs, experiences, and the like are converted into data of a computer readable format. The general knowledge base dictionary data 221 is also referred to as knowledge base dictionary data.

Incidentally, the response generating unit 106 of the information processing device 220 of the present disclosure described in FIG. 2 and the subsequent drawings may not only generate and output the confirmation response in a case in which a response generation command is input from the conversation control unit 104 but also generate and output the confirmation response for reconfirming the content of the user speech in a case in which a normal response generation command other than confirmation response generation command is input from conversation control unit 104.

In other words, the response generating unit 106 determines whether or not the confirmation response is given, and in a case in which it is determined that the confirmation response is given, the response generating unit 106 generates the confirmation response and outputs the confirmation response through the audio output unit (speaker) 107.

A specific example of the confirmation response generated by the response generating unit 106 of the information processing device 220 of the present disclosure will be described.

First, three confirmation response generation examples 101 to 103 illustrated in FIG. 3 will be described.

(Confirmation Response Generation Example 101)

As illustrated in (101) of FIG. 3, for example, it is assumed that the following "speech of user" is performed:

User speech: "Please register shopping schedule in 8-th (Yo-ka)?"

If such a user speech is input, the text, conversion in the voice recognizing unit 102 and the intention understanding in the intention understanding unit 103 are performed, and the intention understanding result is input to the conversation control unit 104. Attribute information indicating the reliability is added to the input data, that is, the conversion data in the voice recognizing unit 102 and the intention understanding result data in the intention understanding unit 103.

The conversation control unit 104 determines whether or not the reliability of the text conversion in the voice recognizing unit 102 and the intention understanding in the intention understanding unit 103 is low on the basis of the attribute information. In a case in which the reliability is lower than a predetermined reference value (a threshold value), the conversation control unit 104 requests the response generating unit 106 to generate and output the confirmation response.

Alternatively, even in a case in which the speech of the user is an important process such as a schedule setting, the conversation control unit 104 requests the response generating unit 106 to generate and output the confirmation response.

In the present process example, for example, the following process is performed.

The intention understanding unit 103 of the information processing device 220 outputs an intention understanding result indicating that the intention of the user is ambiguous (the reliability is low) to the conversation control unit 104 without determining whether "Yo-ka" actually intends "8-th (Yo-ka)" or the user spokes it while intending "4-th (Yokka)" in the intention understanding process for the user speech.

The conversation control unit 104 outputs the confirmation response generation command to the response generating unit 106 on the basis of the input from the intention understanding unit 103, that is, the intention understanding result indicating that the intention of the user is ambiguous.

Incidentally, even in a case in which the intention understanding unit 103 outputs a result of adding high reliability information indicating that "Yo-ka" intends "8-th (Yo-ka) as the attribute information to the conversation control unit 104 in the intention understanding process, the conversation control unit 104 may determine that it is necessary to reconfirm a day on the basis of determination that it is an important process of a schedule setting. Even in a case in which this determination is performed, the confirmation response generation command is output to the response generating unit 106.

Further, even in a case in which the normal response generation command other than confirmation response generation command input from the conversation control unit 104 to the response generating unit 106, the response generating unit 106 determines whether or not the confirmation response is given, and in a case in which it is determined that the confirmation response is given, the response generating unit 106 generates the confirmation response and outputs the confirmation response through the audio output unit (speaker) 107.

In the present embodiment, the response generating unit 106 generates and outputs the following confirmation response for requesting confirmation from the user using the data of the general knowledge base dictionary data 221.

Confirmation response of device: "Do you want to register shopping schedule in 8-th (Hachinichi)?"

The above example is an example of the confirmation response of transferring both readings using the knowledge that there are two readings of "Yo-ka" and "Hachinichi" for 8-th.

The response generating unit 106 acquires this knowledge using the data of the general knowledge base dictionary data 221.

On the basis of the knowledge acquired using the data of general knowledge base dictionary data 221, the response generating unit 106 generates and outputs the following confirmation response:

"Do you want to register shopping schedule in 8-th (Hachinichi)?"

This confirmation response is output to the user via the audio output unit (speaker) 107.

The user can hear the confirmation responses for requesting the confirmation of the two readings (Yo-ka and Hachinichi) of "8-th", be convinced that the day desired to be transferred by the information processing device 220 is 8-th other than 4-th, and prevent mishearing.

(Confirmation Response Generation Example 102)

A second specific example of the confirmation response generated by the response generating unit 106 of the information processing device 220 illustrated in FIG. 2 will be described.

As illustrated in (102) of FIG. 3, for example, it is assumed that the following "speech of user" is performed:

User speech: "Please register shopping schedule in 8-th?"

If such a user speech is input, the text conversion in the voice recognizing unit 102 and the intention understanding in the intention understanding unit 103 are performed, and the intention understanding result is input to the conversation control unit 104.

In a case n which the reliability of the text conversion in the voice recognizing unit 102 and the intention understanding in the intention understanding unit 103 is low or in a case in which the speech of the user is an important process such as a schedule setting, the conversation control unit 104 requests the response generating unit 106 to generate and output the confirmation response.

In the present example, the intention understanding result indicating that it is ambiguous whether the user speech intends "8-th (Yo-ka)" or "4-th (Yokka)" is input to the conversation control unit 104 as the result of the intention understanding in the intention understanding unit 103.

Further, the conversation control unit 104 determines that it is necessary to reconfirm a day on the basis of the determination that the user speech is an important process of requesting a schedule setting, and outputs the confirmation response generation command to the response generating unit 106 on the basis of the determination.

Incidentally, even in a case in which the normal response generation command other than confirmation response generation command is input from the conversation control unit 104 to the response generating unit 106, the response generating unit 106 determines whether or not the confirmation response is given, and in a case in which it is determined that the confirmation response is given, the response generating unit 106 generates the confirmation response and outputs the confirmation response through the audio output unit (speaker) 107.

The response generating unit 106 generates and outputs the following confirmation response for requesting confirmation from the user using the data of the general knowledge base dictionary data 221.

Confirmation response of device: "Is it 8-th, next Wednesday?"

The above example is a confirmation response given by the device in order to confirm whether the intention of the user is "8-th (Yo-ka)" or "4-th (Yokka)".

The response generating unit 106 of the information processing device 220 acquires knowledge indicating that 8-th is next Wednesday using the data of the general knowledge base dictionary data 221 and generates a confirmation response to which information based on the acquired knowledge (8-th is next Wednesday) is added.

This confirmation response is output to the user via the audio output unit (speaker) 107.

Accordingly, the user can be convinced that the information processing device 220 recognizes 8-th other than 4-th.

Further, for example, in a case in which the true intention of the user is considered to desire to register a shopping schedule in Thursday of 9-th, the user hears the response from the device and notices that the user is misunderstanding that 8-th is Wednesday although the user speaks 8-th due to a mistake of the user.

In other words, it is possible to cause the user to notice that 8-th is correctly Wednesday. As a result, the user can recognize that Thursday in which the user desired to register a schedule originally is 9-th, and it is possible to cause the user to perform a speech based on the true intention such as "Please register schedule in 9-th".

(Confirmation Response Generation Example 103)

A third specific example of the confirmation response generated by the response generating unit 106 of the information processing device 220 illustrated in FIG. 2 will be described.

As illustrated in (103) of FIG. 3, for example, it is assumed that the following "speech of user" is performed:

User speech: "Please register shopping schedule in day after three days"

If such a user speech is input, the text conversion in the voice recognizing unit 102 and the intention understanding in the intention understanding unit 103 are performed, and the intention understanding result is input to the conversation control unit 104.

The conversation control unit 104 determines whether or not the reliability of the text conversion in the voice recognizing unit 102 and the intention understanding in the intention understanding unit 103 is low, and in a case in which the reliability is low, the conversation control unit 104 requests the response generating unit 106 to generate and output the confirmation response. Alternatively, even in a case in which the speech of the user is an important process such as a schedule setting, the conversation control unit 104 requests the response generating unit 106 to generate and output the confirmation response.

In the present example, the conversation control unit 104 determines that it is necessary to reconfirm a day on the basis of the determination that it is an important, process of a schedule setting, and outputs the confirmation response generation command to the response generating unit 106 on the basis of the determination.

Incidentally, even in a case in which the normal response generation command other than confirmation response generation command input from the conversation control unit 104 to the response generating unit 106, the response generating unit 106 determines whether or not the confirmation response is given, and in a case in which it is determined that the confirmation response is given, the response generating unit 106 generates the confirmation response and outputs the confirmation response through the audio output unit (speaker) 107.

The response generating unit 106 generates and outputs the following confirmation response for requesting confirmation from the user using the data of the general knowledge base dictionary data 221.

Confirmation response of device: is it 11-th, Thursday?

The above example is an example of a confirmation response of a format for requesting confirmation by replacing "day after three days" included in the user speech with an actual date and a day of the week (11-th, Thursday).

The response generating unit 106 of the information processing device 220 acquires knowledge that "day after three days" is "11-th" and "Thursday" using the data of the general knowledge base dictionary data 221.

The response generating unit 106 generates a response to which this knowledge is added (here, replaced). In other words, the confirmation response "Is it 11-th, Thursday?" is generated and output to the user via the audio output unit (speaker) 107.

Accordingly, the user acquires information such as "11-th" and "Thursday" in addition to "day after three days" spoken by the user.

The certainty about a date to register a schedule can be increased due to the additional information.

Further, in a case in which the true intention of the user is to desire to register a schedule in Friday (day after four days), that is, in a case in which the user is misunderstanding that a "day after three days is Friday", information such as "Thursday" is provided to the user through the confirmation response from the information processing device 220, that is, the confirmation response "Is it 11-th, Thursday?"

As a result, the user thinks "day after three days which is thought to be Friday is Thursday. Then, let's register it in 12-th, day after four days" and can perform a new speech, that is, a correct speech "Please register schedule in day after four days".

As described above, since the response is given by adding other expressions to one piece of information, the user can perform confirmation from a plurality of viewpoints. In the case of this example, the user can notice his/her mistake, and thus a goal sought by the user can be reached quickly. Further, it is possible to perform confirmation of whether or not the system is correctly understanding the speech of the user at the same time.

As described above, the three specific examples (the confirmation response generation examples 101 to 103) described above are examples related to dates, but it is possible to generate the confirmation response for acquiring the intention of the user accurately using the knowledge obtained from the general knowledge base dictionary data 221 illustrated in FIG. 2.

A generation example of the confirmation response which is different from confirmation of date will be described.

Two confirmation response generation examples 104 and 105 illustrated in FIG. 4 will be described.

(Confirmation Response Generation Example 104)

A fourth specific example of the confirmation response generated by the response generating unit 106 of the information processing device 220 illustrated in FIG. will be described.

As illustrated in (104) of FIG. 4, for example, it is assumed that the following "speech of user" is performed:

User speech: "Please let me know how to get to Kinkakuji"

If such a user speech is input, first, the text conversion in the voice recognizing unit 102 and the intention understanding in the intention understanding unit 103 are performed, and the intention understanding result is input to the conversation control unit 104.

In the present example, for example, the intention understanding unit 103 of the information processing device 220 outputs an intension understanding result indicating that the intention of the user is ambiguous to the conversation control unit 104 without determining whether "Kinkakuji" actually intends "Kinkakuji" or the user spokes it by mistake while intending "Ginkakuji" in the intention understanding process.

The conversation control unit 104 outputs the confirmation response generation command to the response generating unit 106 on the basis of the intention understanding result.

The response generating unit 106 of the information processing device 220 generates a confirmation response in response to the input of the confirmation response generation command from the conversation control unit 104.

Incidentally, even in a case in which the normal response generation command other than confirmation response generation command is input from the conversation control unit 104 to the response generating unit 106, the response generating unit 106 determines whether or not the confirmation response is given, and in a case in which it is determined that the confirmation response is given, the response generating unit 106 generates the confirmation response and outputs the confirmation response through the audio output unit (speaker) 107.

The response generating unit 106 generates and outputs the following confirmation response for requesting confirmation from the user using the data of the general knowledge base dictionary data 221.

Confirmation response of device: "Do you mean Kinkakuji made by Ashikaga Yoshimitsu?"

The above example is a confirmation response for confirmation since it is ambiguous whether the speech of the user intends "Kinkakuji" or "Ginkakuji".

In this confirmation response, for example, in a case in which a response "Is it Kinkakuji?" is output without change, the user is likely to mishear (mishear Kinkakuji as Ginkakuji) as well in a case in which the response is given only by voice.

For example, in a case in which the information processing device includes a display unit, it is possible to prevent mishearing of the user by displaying characters which are output by voice on the display unit, but the user does not necessarily look at the display unit.

Therefore, it is desirable to use a response that is unlikely to cause misunderstanding even with voice alone.

Thus, when the above example, that is, information "made by Ashikaga Yoshimitsu" is added to the confirmation response as in Confirmation response of device: "Do you mean Kinkakuji made by Ashikaga Yoshimitsu?", it is possible to increase the certainty for the user.

Incidentally, the response generating unit 106 can generate the confirmation response to which various types of information are added on the basis of the knowledge acquired from the general knowledge base dictionary data 221.

For example, it is possible to generate various confirmation responses as follows.

For example, it is possible to acquire additional information related to Kinkakuji from the general knowledge base dictionary data 221 and generate and output a confirmation response to which the additional information is added such as "Is it golden-colored Kinkakuji?", "Is it Kinkakuji in Mikuni Yukio's novel?", or "Is it Kinkakuji whose official name is Rokuonji?"

(Confirmation Response Generation Example 105)

A fifth specific example of the confirmation response generated by the response generating unit 106 of the information processing device 220 illustrated in FIG. 2 will be described.

As illustrated in (105) of FIG. 4, for example, it is assumed that the following "speech of user" is performed:

User speech: "Please record one channel (Icchanneru) from 5 o'clock"

If such a user speech is input, first, the text conversion in the voice recognizing unit 102 and the intention understanding in the intention understanding unit 103 are performed, and the intention understanding result is input to the conversation control unit 104.

In the present example, in an intention understanding process, the intention understanding unit 103 of the information processing device 220 understands that a channel to be recorded is designated but outputs the intention understanding result indicating that the intention of the user is ambiguous to the conversation control unit 104 since it is ambiguous whether it is 1 ch (Icchanneru) or 10 ch (Jucchanneru).

The conversation control unit 104 outputs the confirmation response generation command to the response generating unit 106 on the basis of the intention understanding result.

The response generating unit 106 of the information processing device 220 generates the confirmation response in response to the input of the confirmation response generation command from the conversation control unit 104.

Incidentally, even in a case in which the normal response generation command other than confirmation response generation command is input from the conversation control unit 104 to the response generating unit 106, the response generating unit 106 determines whether or not she confirmation response is given, and in a case in which it is determined that the confirmation response is given, the response generating unit 106 generates the confirmation response and outputs the confirmation response through the audio output unit (speaker) 107.

The response generating unit 106 generates and outputs the following confirmation response for requesting confirmation from the user using the data of the general knowledge base dictionary data 221.

Confirmation response of device: "Do you like to go with XYZ television?"

The above example is an example in which the intention of the speech of the user is understood to designate a channel to be recorded, but the user is requested to perform confirmation since whether it is 1 ch or 10 ch is ambiguous.

The response generating unit 106 acquires the knowledge that one channel is a channel of "XYZ television" using the data of the general knowledge base dictionary data 221 and generates the confirmation response including a broadcasting station name without presenting digit+channel which is more likely to cause mishearing.

With this process, the user can correctly understand the intention of the confirmation response.

3. (Second Embodiment) Embodiment in which Response Generating Unit Generates Confirmation Response Using Application Executing Unit Next, an embodiment in which the response generating unit generates a confirmation response using an application executing unit will be described as a second embodiment.

Figure 5:
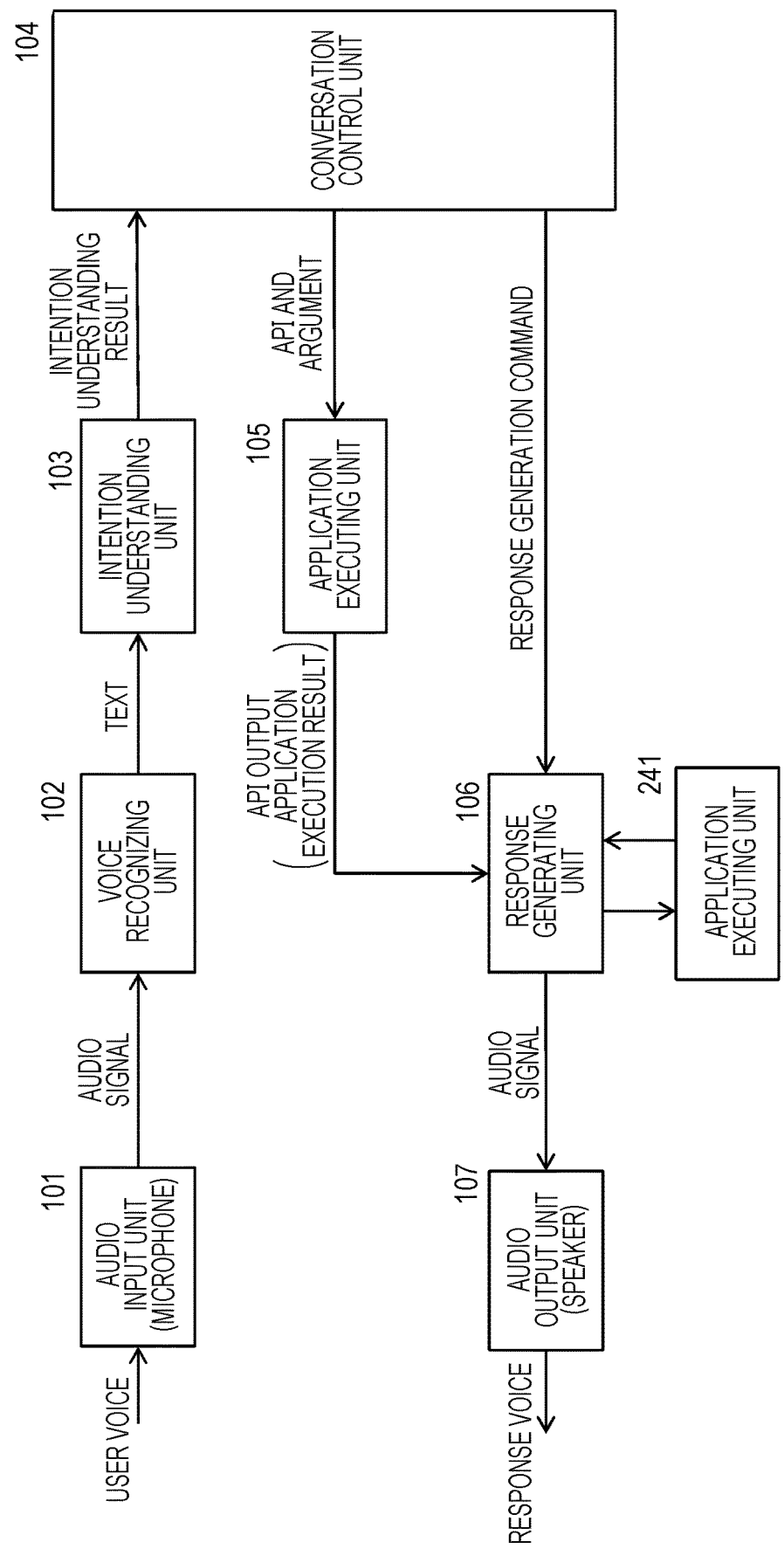
FIG. 5 is a diagram illustrating a configuration example of an information processing device 240 of a second embodiment.

FIG. 5 is a diagram illustrating a configuration example of an information processing device 240 of the present second embodiment.

As illustrated FIG. 5, the information processing device 240 includes an audio input unit (microphone) 101, a voice recognizing unit 102, an intention understanding unit 103, a conversation control unit 104, an application executing unit 105, a response generating unit 106, and an audio output unit (speaker) 107, and further includes application executing unit 241 used for response generation by the response generating unit 106.

The audio input unit (microphone) 101, the voice recognizing unit 102, the intention understanding unit 103, the conversation control unit 104, the application executing unit 105, and the audio output unit (speaker) 107 are configured to perform processes similar to those described with reference to FIGS. 1 and 2, and thus description thereof is omitted.

The response generating unit 106 of the information processing device 240 of the present second embodiment illustrated in FIG. 5 generates the confirmation response using the application executing unit 241.

Incidentally, the application executing unit 241 is not limited to, for example, an application in the information processing device 240 and is configured to be able to use an application executed in various devices connected via a network.

For example, various applications such as a music playback application, a weather information acquisition application, a restaurant reservation application, and the like can be used.

A specific example of the confirmation response generated by the response generating unit 106 of the information processing device 240 of the present embodiment will be described.

First, two confirmation response generation examples 201 and 202 illustrated in FIG. 6 will be described.

(Confirmation Response Generation Example 201)

As illustrated in (201) of FIG. 6, for example, it is assumed that the following "speech of user" is performed:

User speech: "Please register shopping schedule in 10-th?"

If such a user speech is input, the text conversion in the voice recognizing unit 102 and the intention understanding in the intention understanding unit 103 are performed, and the intention understanding result is input to the conversation control unit 104.

The conversation control unit 104 determines whether or not the reliability of the text conversion in the voice recognizing unit 102 and the intention understanding in the intention understanding unit 103 is low, and in a case in which the reliability is low, the conversation control unit 104 requests the response generating unit 106 to generate and output the confirmation response.

Alternatively, even in a case in which the speech of the user is an important process such as a schedule setting, the conversation control unit 104 requests the response generating unit 106 to generate and output the confirmation response.

In the present example, it is determined that it is necessary to reconfirm a day on the basis of the determination that the user speech is an important process of a schedule setting, or the like, and outputs the confirmation response generation command to the response generating unit 106 on the basis of the determination.

Incidentally, even in a case in which the normal response generation command other than confirmation response generation command is input from the conversation control unit 104 to the response generating unit 106, the response generating unit 106 whether or not the confirmation response is given, and in a case in which it is determined that the confirmation response is given, the response generating unit 106 generates the confirmation response and outputs the confirmation response through the audio output unit (speaker) 107.

The response generating unit 106 generates and outputs the following confirmation response for requesting confirmation from the user using the application executing unit 241.

Confirmation response of device: "It is 10-th. It is day to go to concert."

The above example is a confirmation response for reconfirming a shopping date included in the user speech.

The response generating unit. 106 activates a scheduler application in which the schedule of the user is registered using the application executing unit 241 and searches for a schedule of a date (10-th) included in the user speech.

As a result, it is confirmed that a "schedule to go to concert" is set as the schedule of 10-th of the user.

The response generating unit 106 generates a confirmation response in which an amount of information presented to the user is increased using the confirmation result acquired using the application executing unit 241. In other words, the following confirmation response is generated.

Confirmation response of device: "it is 10-th. It is day to go to concert."

The user who heard the above confirmation response via the audio output unit 107 thinks "date to go to a concert which is thought to be 9-th is 10-th. Then, let's register the shopping in 11-th" can perform a new user speech, that is, "Well, register it in 11-th", so that the schedule can be corrected smoothly.

(Confirmation Response Generation Example 202)

A second specific example of the confirmation response generated by the response generating unit 106 of the information processing device 240 illustrated in FIG. 5 will be described.

As illustrated in (202) of FIG. 6, for example, it is assumed that the following "speech of user" is performed:

User speech: "Please let me know how to get to Ginkakuji"

If such a user speech is input, the text conversion in the voice recognizing unit 102 and the intention understanding in the intention understanding unit 103 are performed, and the intention understanding result is input to the conversation control unit 104.

The conversation control unit 104 determines whether or not the reliability of the text conversion in the voice recognizing unit 102 and the intention understanding in the intention understanding unit 103 is low, and in a case in which the reliability is low, the conversation control unit 104 requests the response generating unit 106 to generate and output the confirmation response.

Alternatively, even in a case in which the speech of the user is an important process such as a schedule setting, the conversation control unit 104 requests the response generating unit 106 to generate and output the confirmation response.

In the present example, the conversation control unit 104 requests the response generating unit 106 to generate and output the confirmation response in order to confirm which one of "Kinkakuji" and "Ginkakuji" is the intention of the user speech on the basis of the determination that the reliability of the text conversion in the voice recognizing unit 102 and the intention understanding in the intention understanding unit 103 is low, that is, certainty of whether the user speech is "Kinkakuji" or "Ginkakuji".

Incidentally, even in a case in which the normal response generation command other than confirmation response generation command is input from the conversation control unit 104 to the response generating unit 106, the response generating unit 106 determines whether or not the confirmation response is given, and in a case in which it is determined that the confirmation response is given, the response generating unit 106 generates the confirmation response and outputs the confirmation response through the audio output unit (speaker) 107.

The response generating unit 106 generates and outputs the following confirmation response for requesting confirmation from the user using the application executing unit 241.

Confirmation response of device: "Do you mean Kinkakuji you visited in last August?"

The response generating unit 106 searches for whether or not there is a past schedule related to "Kinkakuji" using a scheduler application (a schedule registration application) activated in the application executing unit 241 and generates a confirmation response in which an amount of information presented to the user is increased in accordance with a result. In other words, the following confirmation response is generated.

Confirmation response of device: "Do you mean Kinkakuji you visited in last August?"

The user who heard the above confirmation response via the audio output unit 107 notices that it says that the user has never been to Ginkakuji because the device misheard "Ginkakuji" as "Kinkakuji". As a result, the user can perform a new user speech, that is, "Well, Ginkakuji other than Kinkakuji" and perform accurate communication.

(Confirmation Response Generation. Example 203)

A third specific example of the confirmation response generated by the response generating unit 106 of the information processing device 240 illustrated in FIG. 5 will be described.

As illustrated in (203) of FIG. 7, for example, it is assumed that the following "speech of user" is performed:

User speech: "Please register Barbecue with Mr. Sato family"

If such a user speech is input, the text conversion in the voice recognizing unit 102 and the intention understanding in the intention understanding unit 103 are performed, and the intention under standing result is input to the conversation control unit 104.

The conversation control unit 104 determines whether or not the reliability of the text conversion in the voice recognizing unit 102 and the intention understanding in the intention understanding unit 103 is low, and in a case in which the reliability is low, the conversation control unit 104 requests the response generating unit 106 to generate and output the confirmation response.

Alternatively, even in a case in which the speech of the user is an important process such as a schedule setting, the conversation control unit 104 requests the response generating unit 106 to generate and output the confirmation response.

In the present example, the conversation control unit 104 requests the response generating unit 106 to generate and output the confirmation response in order to confirm which one of "Mr. Sato" and "Mr. Kato" is the intention of the user speech on the basis of the determination that the certainty whether it is "Mr. Sato" or "Mr. Kato" is low.

Incidentally, even in a case in which the normal response generation command other than confirmation response generation command is input from the conversation control unit 104 to the response generating unit 106, the response generating unit 106 determines whether or not the confirmation response is given, and in a case in which it is determined that the confirmation response is given, the response generating unit 106 generates the confirmation response and outputs the confirmation response through the audio output unit (speaker) 107.

The response generating unit 106 generates and outputs the following confirmation response for requesting confirmation from the user using the application executing unit 241.

Confirmation response of device: "Do you mean Mr. Sato at opposite side?"

The response generating unit 106 generates a confirmation response in which an amount, of information presented to the user is increased in accordance with a result with reference to neighbor information (a name and a location) registered in an address registration application or an acquaintance registration application activated in the application executing unit 241 in other words, the following confirmation response is generated.

Confirmation response of device: "Do you mean Mr. Sato at opposite side?"

The user who heard the above confirmation response via the audio output unit 107 can think (Mr. Sato at opposite side is correct, and the system correctly estimates his/her speech) and perform a new user speech, that is, give a response such as "Yes".

As described above, the confirmation response generation examples 201 to 203 described above are examples in a case in which the reliability of the voice recognition or the intention understanding result is low, but the problems can be solved through similar means even in a case in which the reliability of the voice recognition or the intention understanding result is high, but content thereof has a plurality of candidates.

Such confirmation response generation examples will be described below.

(Confirmation Response Generation Example 204)

A fourth specific example of the confirmation response generated by the response generating unit 106 of the information processing device 240 illustrated in FIG. 5 be described.

As illustrated in (204) of FIG. 7, for example, it is assumed that the following "speech of user" is performed:

User speech: "Please register Barbecue with Mr. Sato family"

If such a user speech is input, the text conversion in the voice recognizing unit 102 and the intention understanding in the intention understanding unit. 103 are performed, and the intention understanding result is input to the conversation control unit 104.

The conversation control unit 104 determines whether or not the reliability of the text conversion in the voice recognizing unit 102 and the intention understanding in the intention understanding unit 103 is low, and in a case in which the reliability is low, the conversation control unit 104 requests the response generating unit 106 to generate and output the confirmation response.

Alternatively, even in a case in which the speech of the user is an important process such as a schedule setting, the conversation control unit 104 requests the response generating unit 106 to generate and output the confirmation response.

In the present example, the speech of the user is an important process such as a schedule setting, and the response generating unit 106 is requested to generate and output the confirmation response.

Incidentally, even in a case in which the normal response generation command other than confirmation response generation command is input from the conversation control unit 104 to the response generating unit 106, the response genera unit determines whether or not the confirmation response is given, and in a case in which it is determined that the confirmation response is given, the response generating unit. 106 generates the confirmation response and outputs the confirmation response through the audio output unit (speaker) 107.

The response generating unit. 106 generates and outputs the following confirmation response for requesting confirmation from the user using the application executing unit 241.

Confirmation response of device: "Do you mean your neighbor, Mr. Sato?"

The response generating unit 106 recognizes that there are two pieces of person data corresponding to "Mr. Sato" registered in the address registration application or the acquaintance registration application activated in the application executing unit 241. Mr. Sato whose registered address is a neighbor and Mr. Sato whose registered address is distant and who is a company colleague are registered, and a confirmation response for confirming which of them is the intention of the user speech is generated. In other words, the following confirmation response is generated.

Confirmation response of device: "Do you mean your neighbor, Mr. Sato?"

The user who heard the above confirmation response via the audio output unit 107 can think (I see, there is more than one Mr. Sato, and I want to register someone who is not Mr. Sato in my neighborhood" and perform a new user speech, that is, give a response such as "Well, Mr. Sato which is my colleague".

Incidentally, in addition to the above-described example, the response generating unit 106 may generate a response such as "Do you mean Mr. Taro Sato?" using, for example, a given name of Mr. Sato registered in the address registration application.

4. (Third Embodiment) Embodiment in which Response Generating Unit Generates Confirmation Response Using Information of Information Input Unit Next, an embodiment in which the response generating unit generates the confirmation response using, for example, non-Voice information of an information input unit such as an image input unit will be described as a third embodiment.

Figure 8:
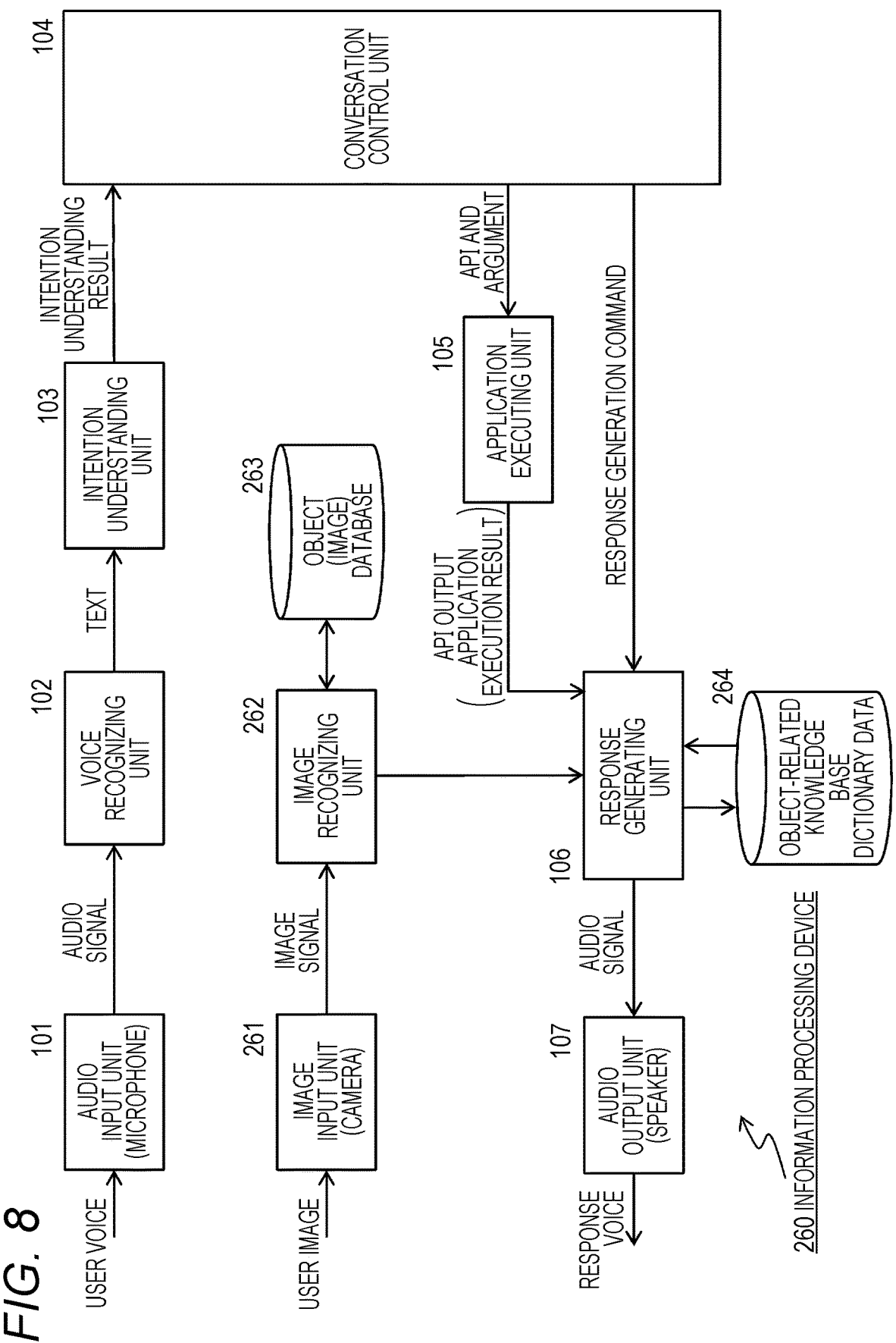
FIG. 8 is a diagram illustrating a configuration example of an information processing device 260 of a third embodiment.

FIG. 8 is a diagram illustrating a configuration example of an information processing device 260 of the present third embodiment.

As illustrated in FIG. 5, the information processing device 260 includes an audio input unit (microphone) 101, a voice recognizing unit 102, an intention understanding unit 103, a conversation control unit 104, an application executing unit 105, a response generating unit 106, and an audio output unit (speaker) 107, and further includes an image input unit (camera) 261, an image recognizing unit 262, an object (image) database 263, and an object-related knowledge base dictionary data 264.

The audio input unit (microphone) 101, the voice recognizing unit 102, the intention understanding unit 103, the conversation control unit 104, the application executing unit 105, and the audio output unit (speaker) 107 are configured to perform processes similar to those described with reference to FIGS. 1 and 2, and thus description thereof is omitted.

The information processing device 260 of the present third embodiment illustrated in FIG. 8 includes the image input unit (camera) 261 that inputs an image around the user including an image of a user who performs a speech.

A captured image of the image input unit (camera) 261 is input to the image recognizing unit. 262, and the image recognizing unit. 262 identifies various objects (persons or goods) included in the captured image by comparing the input image with registered information of the object (image) database 263 which is a database in which various object images are registered in advance.

The response generating unit 106 receives object information of an environment around the speaking user identified by the image recognizing unit 262 and generates the confirmation response using the object-related knowledge base dictionary data 264.

A specific example of the confirmation response generated by response generating unit 106 of the information processing device 260 of the present embodiment will be described.

A confirmation response generation example 301 illustrated in FIG. 9 will be described.

(Confirmation Response Generation Example 301)

Figure 9:
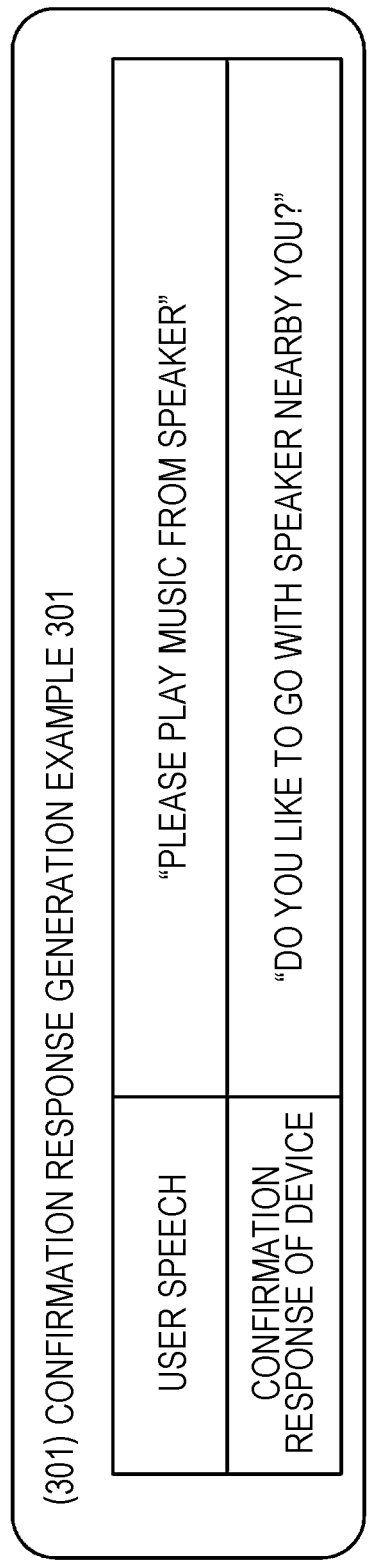
FIG. 9 is a diagram for describing a confirmation response generation example to which the information processing device 260 of the third embodiment is applied.

As illustrated in (301) of FIG. 9, for example, it is assumed that the following "speech of user" is performed:

User speech: "Please play music from speaker"

If such a user speech is input, the text conversion in the voice recognizing unit 102 and the intention understanding in the intention understanding unit. 103 are performed, and the intention understanding result is input to the conversation control unit 104.

The conversation control unit 104 determines whether or not the reliability of the text conversion in the voice recognizing unit 102 and the intention understanding in the intention understanding unit 103 is low, and in a case in which the reliability is low, the conversation control unit 104 requests the response generating unit 106 to generate and output the confirmation response.

Alternatively, even in a case in which the speech of the user is an important process such as a schedule setting, the conversation control unit 104 requests the response generating unit 106 to generate and output the confirmation response.

In the present example, the conversation control unit 104 can understand that the intention of the user speech is an intention. "Please play music from speaker", and the conversation control unit 104 may not request the response generating unit 106 to generate and output the confirmation response.

However, the response generating unit 106 receives the object information of the environment around the speaking user identified by the image recognizing unit 262 and can understand that there are speakers near the speaking user with reference to dictionary data of the object-related knowledge base dictionary data 264.

In such a case, the response generating unit 106 determines that the confirmation response is given, generates the confirmation response, and outputs the confirmation response via the audio output unit (speaker) 107.

Specifically, the following confirmation response for requesting confirmation from the user is generated and output.

Confirmation response of device: "Do you like to go with speaker nearby you?"

This example is a confirmation response generated as the response generating unit 106 detects that there is a speaker near the speaking user on the basis of the input from the image recognizing unit 262, and further detects that there are a plurality of controllable speakers on the basis of the object-related knowledge base dictionary data 264.

Confirmation of which speaker is the intention of the user speech is performed since the user designates only "speaker".

Since it is possible to confirm that there is a speaker nearby the speaking user on the basis of the image information analyzed by the image recognizing unit 262, a response sentence corresponding to a result thereof is output, an amount of information presented to the user is increased, and the following confirmation response is generated and output.

Confirmation response of device: "Do you like to go with speaker nearby you?"

The user who heard the above confirmation response via the audio output unit 107 can think (Yes, this speaker) and perform a new user speech, that is, give a response such as "Yes, that is correct", accordingly.

Next, as a modified example of the present third embodiment, a configuration and a process for performing identification on the basis of the input information from the information input unit will be described with reference to FIG. 10 and the subsequent drawings.

An information processing device 280 illustrated in FIG. 10 has a configuration similar to the configuration described with reference to FIG. 8 but is different in the following points:

the image recognizing unit 262 of FIG. 8 is replaced with a user identifying unit 282 of FIG. 10;

the object (image) database 263 of FIG. 8 is replaced with a user image database 283 in FIG. 10; and the object-related knowledge base dictionary data 264 of FIG. 8 is replaced with a user information-related knowledge base dictionary data 284 of FIG. 10.

The information processing device 280 illustrated in FIG. 10 inputs a face image of a person nearby the user who performs a speech from the image input unit (camera) 261 to the user identifying unit 282. The user identifying unit 282 identifies a person included in a captured image by comparing the received face image with registered information of the user image database 283 which is a database in which various user images are registered in advance.

The response generating unit 106 receives user information identified by the user identifying unit 282 and generates the confirmation response using the user information-related knowledge base dictionary data 284.

A specific example of the confirmation response generated by response generating unit 106 of the information processing device 280 of the present embodiment will be described.

A confirmation response generation example 302 illustrated in FIG. 11 will be described.

(Confirmation Response Generation Example 302)

Here, it is assumed that a conversation between the user and the information processing device 280 was performed at a stage prior to the user speech, and a process of deciding a tonight dinner place was performed. Thereafter, as illustrated in (302) of FIG. 11, it is assumed that the following "speech of user" is performed.

User speech: "Please send email to Yuki then"

If such a user speech is input, the text, conversion in voice recognizing unit 102 and the intention understanding in the intention understanding unit. 103 are performed, the intention understanding result is input to conversation control unit 104, and the conversation control unit 104 requests the response generating unit 106 to generate and output a response.

However, the response generating unit 106 receives person information nearby the user identified by the user identifying unit 282, and further detects that there is no "Yuki" nearby the speaking user with reference to dictionary data of the user information-related knowledge base dictionary, data 284.

Further, the speaking user is determined to be dad on the basis of the identification information of the user identifying unit 282 and the dictionary data of the user information-related knowledge base dictionary data 284, and it is recognized that mom and Yuko who is daughter are together.

The response generating unit 106 determines that a personal name "Yuki" included in the user speech of dad who is the speaking user: "Please send email to Yuki then" is also likely to be "Yuko", and generates the confirmation response for confirming whether an e-mail destination is "Yuki" or "Yuko". In other words, the following confirmation response is generated:

Confirmation response of device: "E-mail will be sent to Yuki? Yuki is not here now?"

The above example of the confirmation response is an example or the confirmation response based on a result of recognizing that a speaking person is dad, and mom and Yuko who is a daughter are also looking at a screen together and determining that certainty of whether an intention of a speaker is "Yuko" or "Yuki" is low on the basis of the identification information of the user identifying unit 282 and the dictionary data of the user information-related knowledge base dictionary data 284 through the response generating unit 106.

A family registered in the user information-related knowledge base dictionary data 284 includes four people of dad, mom, Yuki (son), and Yuko (daughter), but since Yuko is recognized to be now here on the basis of the identification information of the user identifying unit 282, a result thereof is included in a response sentence, and thus an amount of information presented to the user is increased. As a result, the user can think (Yes, I like to send an e-mail to Yuki) and can perform a new user speech, that is, give a response "Please send it".

Further, the response generating unit 106 in the information processing device 280 illustrated in FIG. 10 can perform the following process using the user identification information of the user identifying unit 282 or the information of the user information-related knowledge base dictionary data 284.

The response generating unit 106 can change the configuration of the confirmation response in accordance with an attribute (an age or the like) of the speaking user when generating a response language.

A specific example is illustrated in FIG. 12

(Confirmation Response Generation. Example 303)

A confirmation response example 303 is an example in which the response generating unit 106 determines that the speaking user is young in age using the user identification information of the user identifying unit 282 or the information of the user information-related knowledge base dictionary data 284.

As illustrated in (303) of FIG. 12, it is assumed that the following "speech of user" is performed.

User speech: "Please let me know how to get to Kinkakuji"

The response generating unit. 106 determines that the speaking user is young in age using the user identification information of the user identifying unit 282 or the information of the user information-related knowledge base dictionary data 284.

In this case, the response generating unit 106 generates and outputs the following confirmation response.

Confirmation response of device: "Do you mean Kinkakuji shinning in golden brown?"

In a case in which the age of the user is young in age, the user is unlikely to have detailed knowledge about. Kinkakuji or Ginkakuji. Therefore, if the user does not have knowledge for it even when knowledge such as "made by Ashikaga Yoshimitsu" is added to the response sentence, for example, it is a source of confusion. In this regard, the ambiguity can be resolved more reliably by adding knowledge that is easy for anyone to understand for such a user.

(Confirmation Response Generation Example 304)

A confirmation response example 304 is an example in which the response generating unit 106 determines that the speaking user is old in age using the user identification information of the user identifying unit 282 or the information of the user information-related knowledge base dictionary data 284.

As illustrated in (304) of FIG. 12, it is assumed that the following "speech of user" is performed.

User speech: "Register schedule of going out in 10-th"

The response generating unit 106 determines that the speaking user is old in age using the user identification information of the user identifying unit 282 or the information of the user information-related knowledge base dictionary data 284.

In this case, the response generating unit 106 generates and outputs the following confirmation response:

Confirmation response of device: "Do you mean flag holiday of 10-th?"

In a case in which "10-th" is a national holiday, it can be expressed with various words such as "national holiday", "off day", and "holiday", but there is "flag holiday" as an expression that has not been used recently. Depending on the age (or environment) of the user, "flag holiday" may be easier to understand, and in such a case, a response sentence is generated and output using an expression for that age.

(Confirmation Response Generation Example 305)

A confirmation response example 305 is an example in which the response generating unit 106 determines that the speaking user is a junior high school student using the user identification information of the user identifying unit 282 or the information of the user information-related knowledge base dictionary data 284.

As illustrated in (305) of FIG. 12, it is assumed that the following "speech of user" is performed:

User speech: "Please call school"

It is difficult to specify which school is-intended-among many schools from this speech. Further, even in a case is which there are two or more students in the family of the user (for example, an elementary school student and a junior high school student, or the like), it is not difficult to specify which school is intended.

The response generating unit 106 specifies the user who speaks using the user identification information of the user identifying unit 282 or the information of the user information-related knowledge base dictionary data 284, and acquires knowledge that the user is a student of Shinagawa junior high school. The response generating unit 106 generates and outputs the following confirmation response on the basis of this acquired knowledge:

Confirmation response of device: "Do you mean Shinagawa junior high school".

As described above, the confirmation response using the school name is presented to the speaking user, and thus it is possible for the speaking user to easily confirm that the device side correctly recognizes the user speech.

Further, the response generating unit 106 can also switch content of the response in accordance with a status or history of the user.

A specific example is illustrated in FIG. 13.

(Confirmation Response Generation Examples 306 and 307)

A confirmation response example 306 illustrated in FIG. 13 is an example of a response in a case in which the speaking user (an attribute in the family: father) is speaking alone.

A confirmation response example 307 is an example of a response in a case in which the speaking user (an attribute in the family: father) is speaking with the family.

As illustrated in (306) of FIG. 13, it is assumed that the following "speech of user" is performed.

User speech: "Please let me know road conditions to grandmother's house"

The response generating unit 106 is assumed to identify that the speaking user is a father and the speaking user (an attribute in the family: father) is speaking alone in the case of the confirmation response example 306 using the user identification information of the user identifying unit 282 or the information of the user information-related knowledge base dictionary data 284.

In this case, the response generating unit 106 generates and outputs the following confirmation response:

Confirmation response of device "You mean house of Mrs. ΔΔ (user's grandmother)?"

Figure 14:
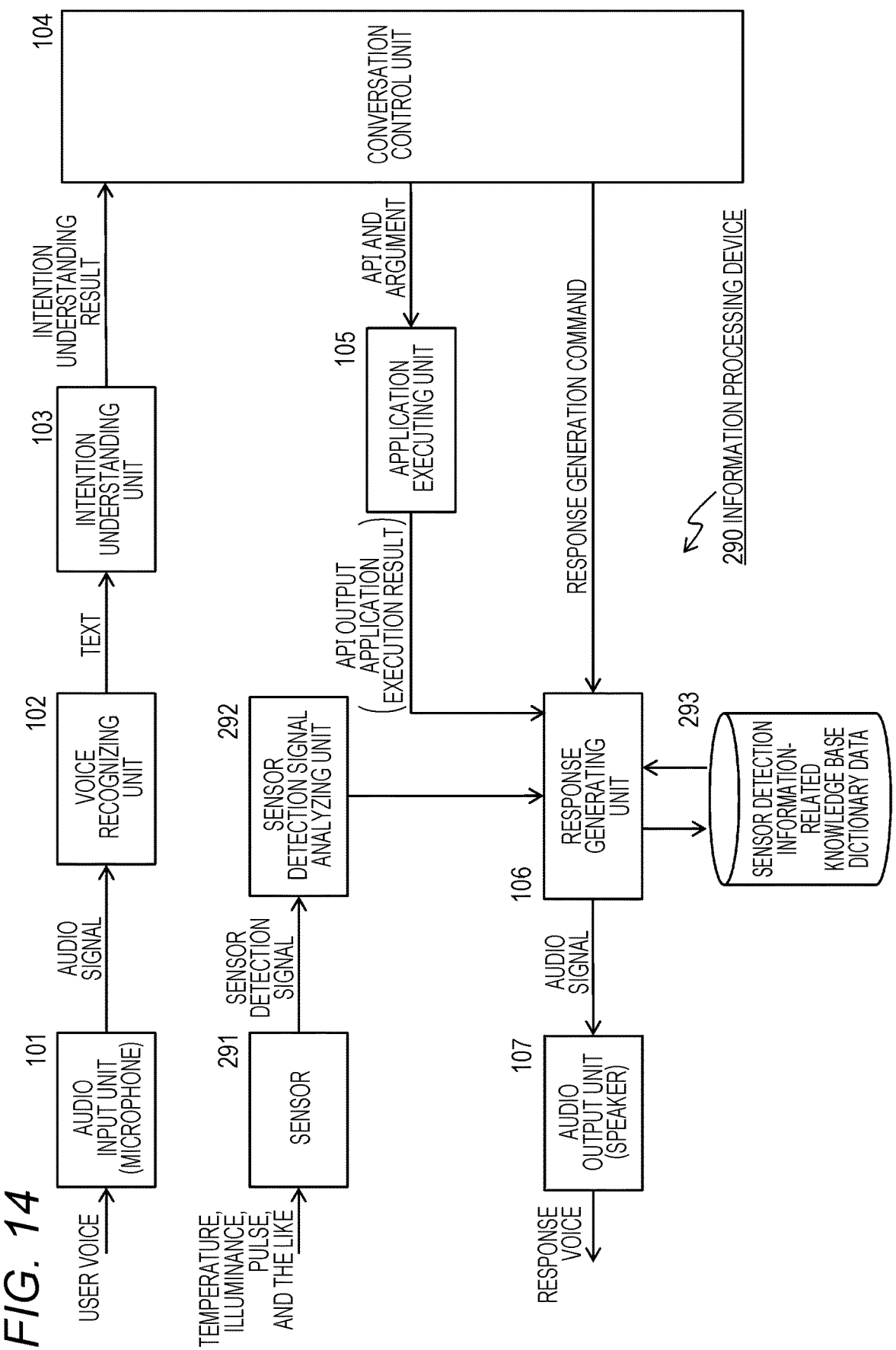
FIG. 14 is a diagram illustrating a configuration example of an information processing device 290 which is a modified example of the third embodiment.

On the other hand, (307) the confirmation response example 307 illustrated in FIG. 14 is an example in which it is identified that the speaking user (the attribute in the family: father) is speaking with the family.

In this Case, the response generating unit 106 generates and outputs the following confirmation response:

Confirmation response of device: "You mean house of Mrs. ○○ (user's mother, grandmother to user's children)?"

This example is an example in a case in which the certainty of whether the user speech is "aunt" or "grandmother" is low. Here, a person to whom. The word "grandmother" refers is not unique, and a target person differs depending on who the grandmother is. Here, the name of the person considered to be a "grandmother" of the user is included in the response sentence under determination that it is likely to indicate a grandmother of the user in a case in which it is a situation in which the user is speaking along, and it is likely to indicate a grandmother of children if it is a situation in which the user is speaking together with his/her children. As described above, the confirmation response is switched in accordance with the situation of the user, and thus it is possible for conversation participants who are present at that place to confirm content more easily.

Next, as a modified example of the present third embodiment, a configuration and a process of generating the confirmation response on the basis of input information from a sensor using a sensor that detects, for example, a temperature, illuminance, a pulse of a user, or the like as the information input unit will be described with reference to FIG. 14 and the subsequent drawings.

An information processing device 290 illustrated in FIG. 14 has a configuration similar to the configuration described with reference to FIG. 8 but differs in the following points:

the image input unit (camera) 261 of FIG. 8 is replaced with a sensor 291 of FIG. 14;

the image recognizing unit 262 of FIG. 8 is replaced with a sensor detection signal analyzing unit 292 of FIG. 14;

the object (image) database 263 of FIG. 8 is omitted in FIG. 14; and the object-related knowledge base dictionary data 264 of FIG. 8 is replaced with a sensor detection information-related knowledge base dictionary data 293 of FIG. 14.

The information processing device 290 illustrated in FIG. 14 inputs detection information of the sensor 291 that detects a situation (context) about the user who performs a speech or various objects nearby the user to the sensor detection signal analyzing unit 292.

The sensor 291 is, for example, a sensor that detects a temperature, humidity, illuminance, or the like of a room of the speaking user, a sensor that detects operation statuses of various devices nearby the speaking user such as an operation status of a television or an air conditioner, or a detection sensor that detects a body temperature, a heart rate, a pulse, or the like of the user.

The sensor detection signal analyzing unit 292 analyzes the detection signals of the sensors and inputs analysis results to the response generating unit 106.

The response generating unit. 106 inputs sensor detection information analyzed by the sensor detection signal analyzing unit 292 and generates the confirmation response using the sensor detection information-related knowledge base dictionary data 29.

A specific example of the confirmation response generated by the response generating unit 106 of the information processing device 290 of the present embodiment will be described.

A confirmation response generation example 308 illustrated in FIG. 15 will be described.

(Confirmation Response Generation Example 308)

An example described below is an example using a temperature sensor which measures a temperature of a room of the speaking user as the sensor 291.

The sensor detection signal analyzing unit 292 detects that the temperature of the room of the speaking user is 10° C. (cold), and inputs this temperature information (10° C.) to the response generating unit 106.

Figure 15:
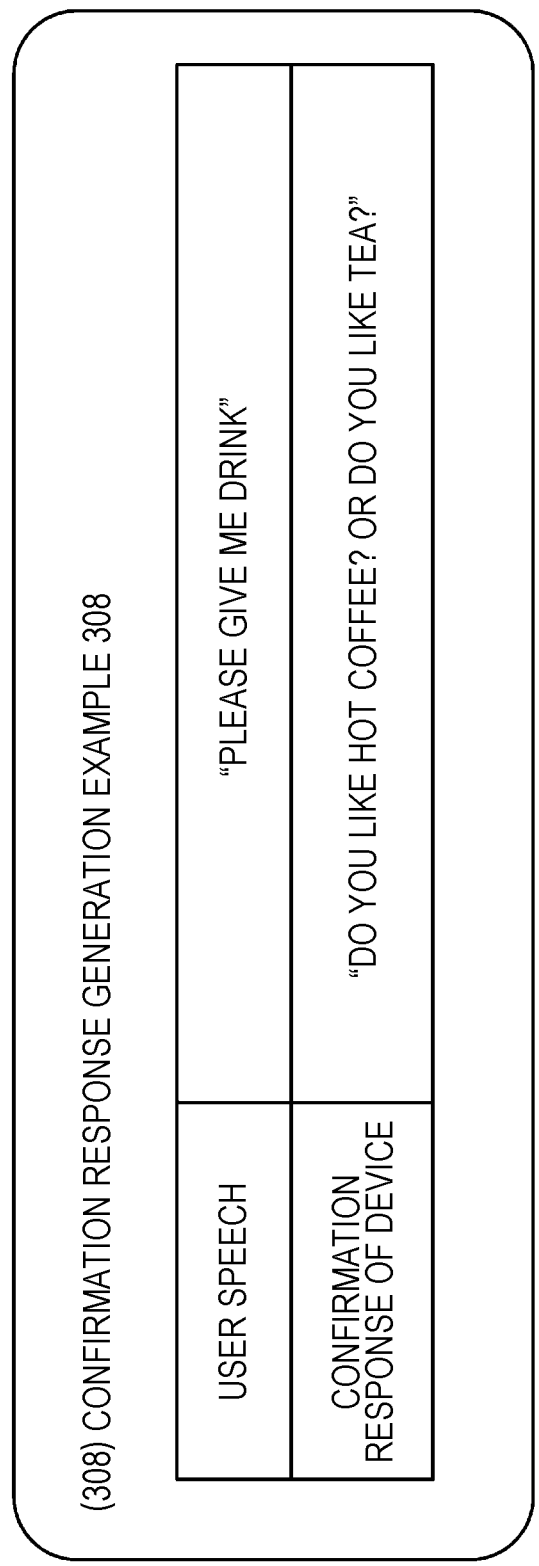
FIG. 15 is a diagram for describing a confirmation response generation example to which the information processing device 280 which is the modified example of the third embodiment is applied.

Thereafter, as illustrated in (308) of FIG. 15, it is assumed that the following "speech of user" is performed.

User speech: "Please give me drink"

If such a user speech is input, the text conversion in voice recognizing unit 102 and the intention understanding in intention understanding unit 103 are performed, the intention understanding result is input to the conversation control unit 104, and the conversation control unit. 104 requests the response generating unit 106 to generate and output the response.

Here, the response generating unit 106 determines that the temperature of the room of the speaking user is 10° C. (cold) on the basis of the information input from the sensor detection signal analyzing unit 292 and generates and outputs the following confirmation response:

Confirmation response of device: "Do you like hot coffee? Or do you like tea?"

In the above example of the confirmation response, the response generating unit 106 recognizes that it is a state in which the temperature s 10° C. and cold on the basis of the information input from the sensor detection signal analyzing unit 292 and determines that the speaking user is more likely to want a hot drink than a cold drink in the situation in which there are hot drinks such as coffee and tea and cold drinks such as milk and juice as drinks that can be provided to the user.

Incidentally, knowledge that the user is likely to want a hot drink such as coffee, tea, or the like in a case in which it is cold and likely to want a cold drink such as milk, juice, or the like in a case in which it is hot is acquired from the sensor detection information-related knowledge base dictionary data 293.

5. (Fourth Embodiment) Embodiment in which Output of Image or Control Signal is Performed Along with Audio Output Next, an embodiment in which an output of an image or a control signal is performed together with an audio output will be described as a fourth embodiment.

An embodiment described below is an embodiment in which an output of an image or a control signal is performed together with an output of the confirmation response by voice to the user.

It is a configuration in which non-voice information is used so that the user can easily understand content of the response.

A configuration example of an information processing device 310 of the present embodiment will be described with reference to FIG. 16.

Figure 16:
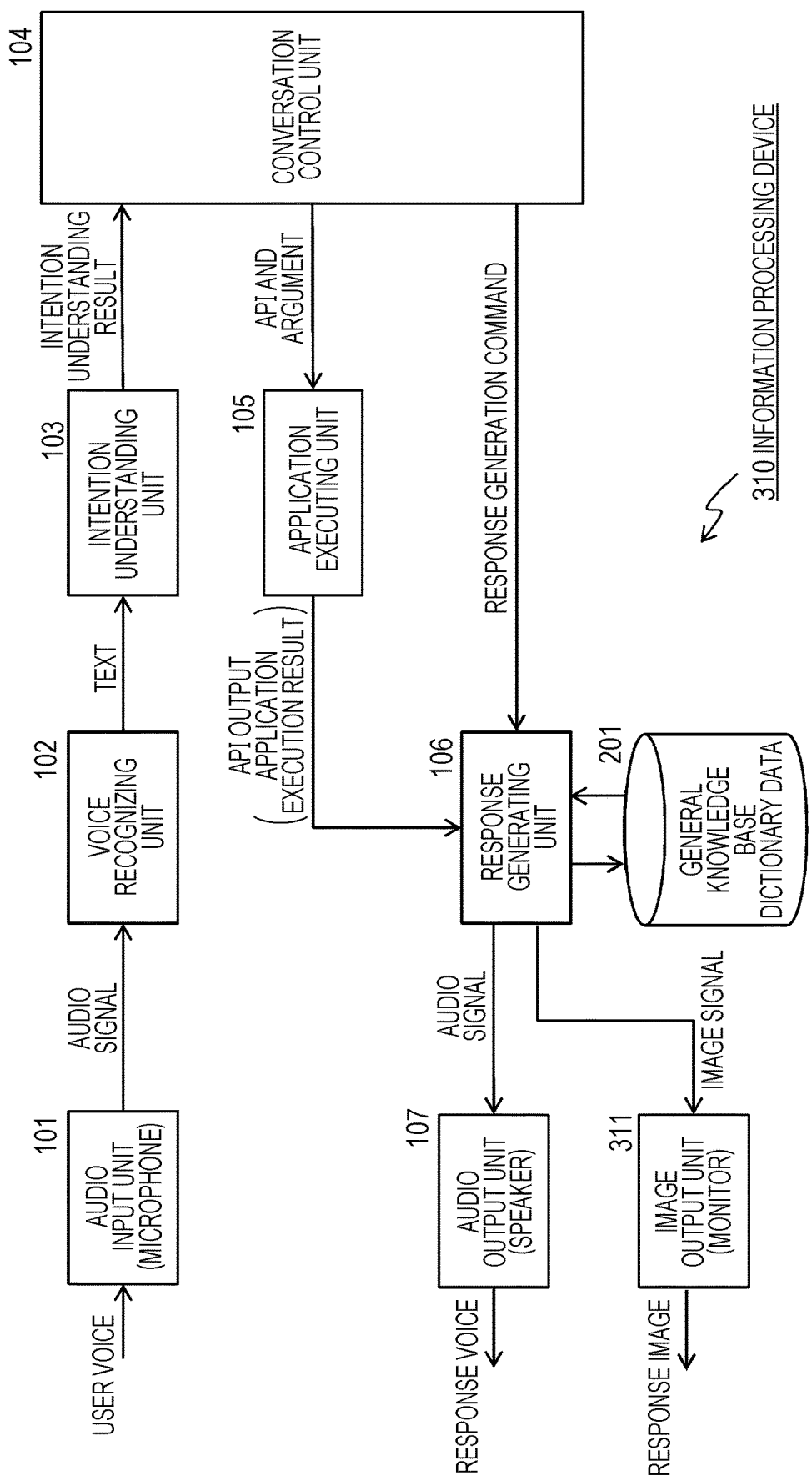
FIG. 16 is a diagram illustrating a configuration example of an information processing device 310 of a fourth embodiment.

The information processing device 310 illustrated in FIG. 16 has a configuration obtained by adding an image output unit (monitor) 311 to the configuration of the information processing device 220 illustrated in FIG. 2 described above as the first embodiment.

The response generating unit 106 in the information processing device 310 outputs a voice of the confirmation response via the audio output unit (speaker) 107 and outputs an explanation image in accordance with the voice of the confirmation response via the image output unit (monitor) 311.

A specific example of the confirmation response generated by the response generating unit 106 of the information processing device 310 of the present embodiment will be described.

A confirmation response generation example 401 illustrated in FIG. 17 will be described.

(Confirmation Response Generation Example 401)

Figure 17:
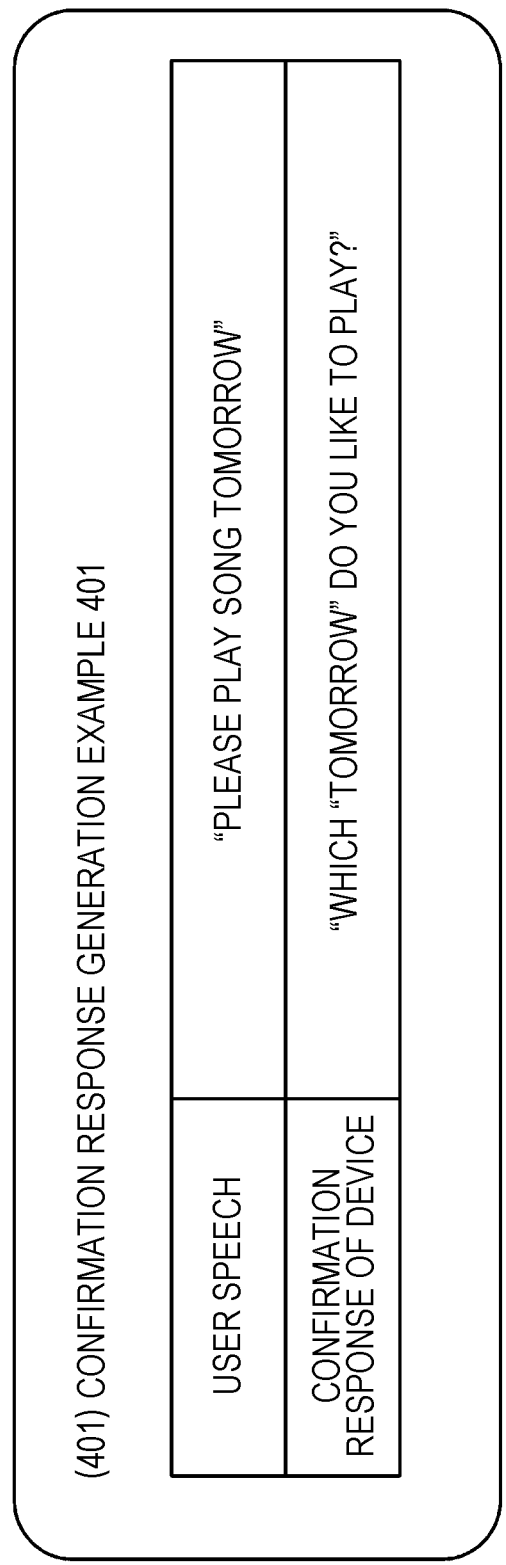
FIG. 17 is a diagram for describing a confirmation response generation example to which the information processing device 310 of the fourth embodiment is applied.

As illustrated in FIG. 17, for example, it is assumed that the following "speech of user" performed:

User speech: "Please play song Tomorrow"

Here, the song "Tomorrow" is assumed to be sung by a plurality of singers.

In other words, it is necessary for the information processing device 310 to confirm which singer's "Tomorrow" the user wants to May.

The response generating unit 106 confirms that the song "Tomorrow" is sung by a plurality of singers on the basis of the data of the general knowledge base dictionary data 221 and acquires names, CD jacket images, and the like of the singers.

The response generating unit 106 outputs the following confirmation response to the audio output unit 107 while outputting the names, the CD jacket images, and the like of the singers who are singing "Tomorrow" obtained using the data of the general knowledge base dictionary data 221 to the image output unit 311:

Confirmation response of device: "Which "Tomorrow" do you like to play?"

This example is an example in which a plurality of songs were found when the song "Tomorrow" was searched for. In a case in which a plurality of examples are conveyed to the user only by voice, it is necessary to convey several contents at the same time. For example, is necessary to convey whether or not a notation is hiragana, whether or not kanji is used, and a singer who sings the song, but it is difficult to understand them only by voice.

Here, in a case in which an image can be used as a modal that conveys the response, the user can easily understand content by simultaneously displaying a song title, an artist name, a jacket photograph, or the like. However, since this case is under the assumption that the user is looking at the screen, it is desirable to provide a configuration of determining whether or not the user is looking at the screen or whether or not the user is at a position in which the user can look at the screen by recognition using a separate sensor or the like and then deciding whether the screen is used or only voice is used.

Further, as a modified example of the present embodiment, an example in which the response generating unit. 106 outputs a control signal for an external device in addition to the confirmation response will be described.

A configuration example of an information processing device 320 of the present embodiment will be described with reference to FIG. 18.

Figure 18:
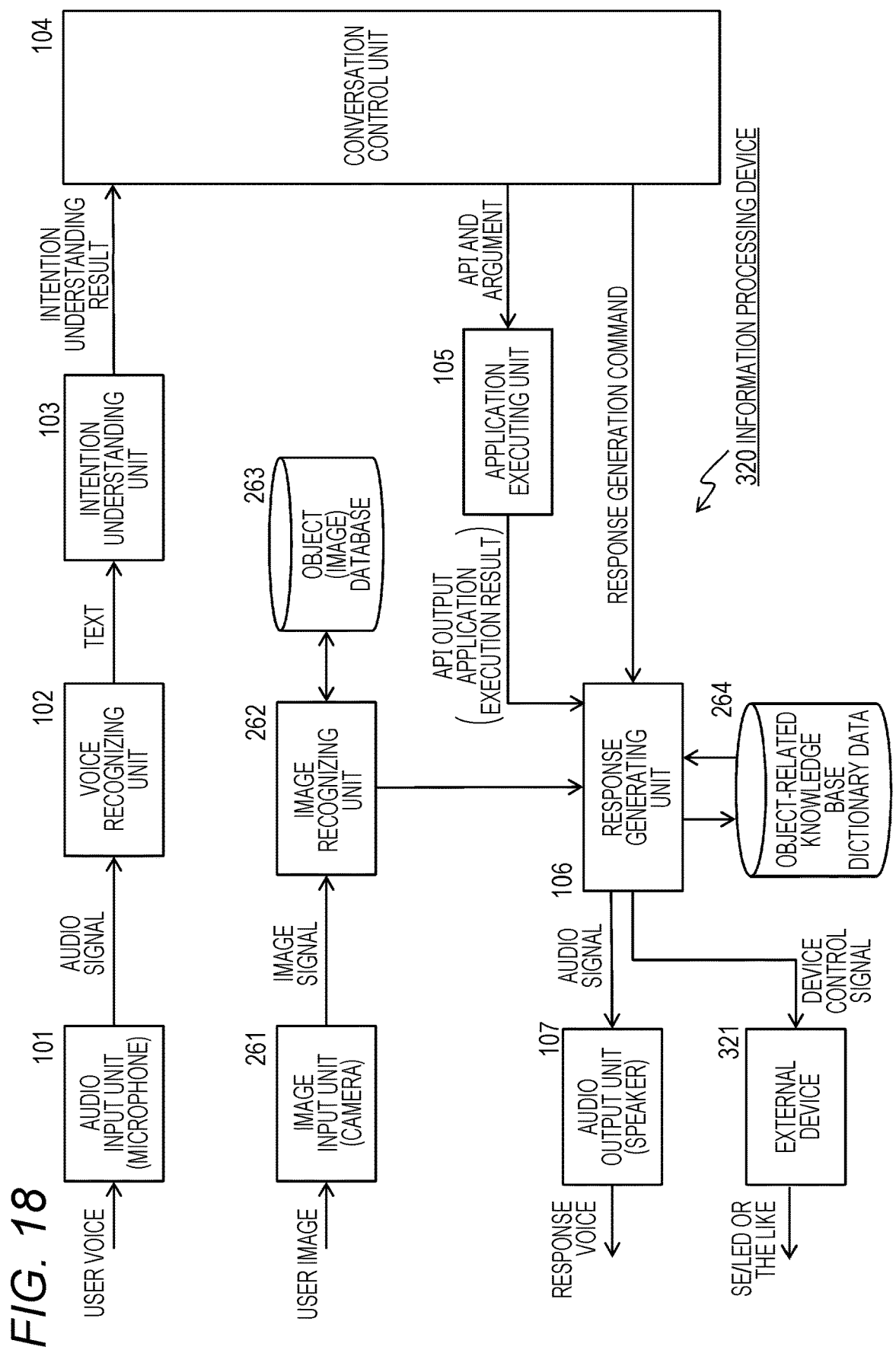
FIG. 18 is a diagram illustrating a configuration example of an information processing device 320 which is a modified example of the fourth embodiment.

The information processing device 320 illustrated in FIG. 18 is based on the configuration of the information processing device 260 illustrated in FIG. 8 described above as the third embodiment and has a configuration in which the response generating unit 106 not only executes the audio output via the audio output unit (speaker) 107 but also outputs the control signal to an external device 321.

The response generating unit 106 in the information processing device 310 outputs the voice of the confirmation response via the audio output unit (speaker) 107 and outputs the control signal to the external device 321 to control the external device 321.

A specific example of the confirmation response generated by the response generating unit 106 of the information processing device 320 of the present embodiment will be described.

A confirmation response generation example 402 illustrated in FIG. 19 will be described.

(Confirmation Response Generation Example 402)

Figure 19:
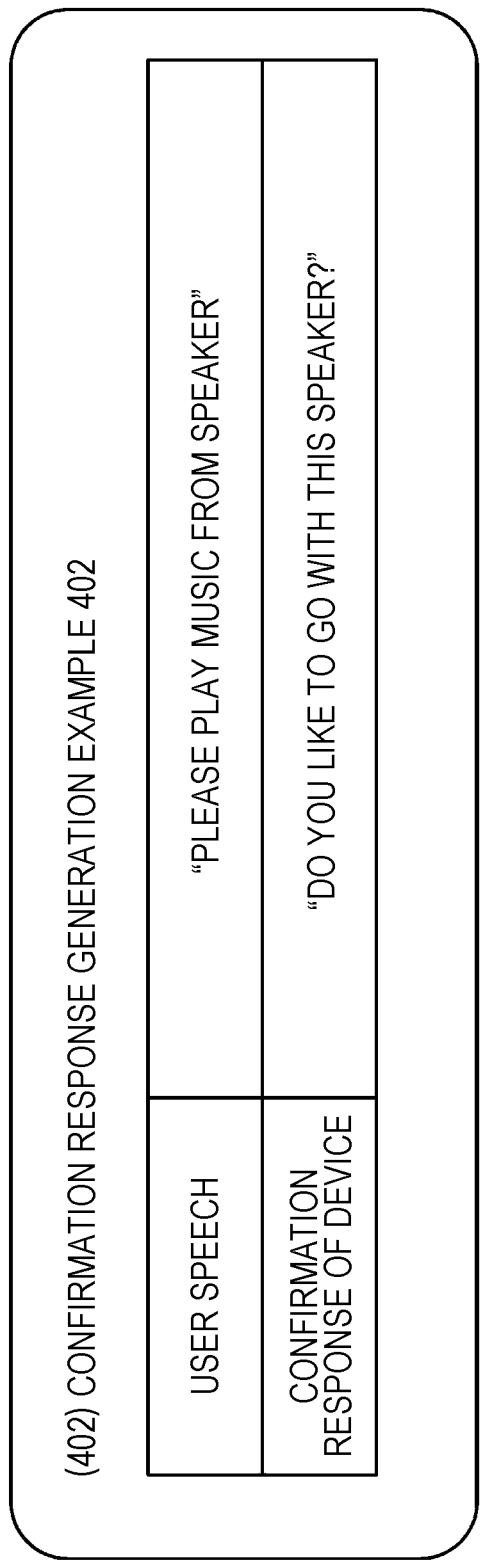
FIG. 19 is a diagram for describing a confirmation response generation example to which the information processing device 320 which is the modified example of the fourth embodiment is applied.

As illustrated in (402) of FIG. 19, for example, it is assumed that the following "speech of user" is performed:

User speech: "Please play music from speaker"

Here, it is assumed that there are a plurality of speakers nearby the speaking user.

In other words, it is necessary for the information processing device 320 to confirm which one of the speakers near by the user is used to play music.

The response generating unit 106 acquires output form information of the control signal to each speaker on the basis of position information of a plurality of speakers input from the image recognizing unit 262 and the object-related knowledge base dictionary data.

Further, the response generating unit 106 first outputs, for example, a control signal for blinking an LED of the speaker (external device) closest to the user to the speaker (external device) using the acquired information, and outputs the following confirmation response via the audio output unit 107 while blinking the LED:

Confirmation response of device: "Do you like to go with this speaker?"

This example is a confirmation response for confirming which speaker is the intention of the user speech since there are a plurality of speakers nearby the user, but the user designates only "speaker".

The response generating unit 106 can confirm that there as a speaker nearby the speaking user on the basis of image information and thus can output an LED blinking control signal to the speaker and cause the user to reliably confirm which speaker is "this speaker" included in the confirmation response.

As a result, the user can think (Yes, this speaker) and give a response such as "Yes, that is correct".

However, since this case is under the assumption that the user is in the vicinity of the speaker, it is desirable to determine whether or not the user is in the vicinity of the speaker or whether or not the user is at a position in which the user can look at the speaker by recognition using a separate sensor or the like and then perform control such that an optimum process is performed.

Further, the response generating unit 106 may be configured to further receive, for example, recognition and identification results by sensors and change the output form of the response or the control signal in accordance with the recognition and identification results by the sensors.

6. (Fifth Embodiment) Embodiment in which Confirmation Response is Generated on the Basis of Conversation History Next, an embodiment in which the confirmation response is generated on the basis of a conversation history will be described.

The following embodiment is an embodiment that can be used in any of the first to fourth embodiments described above and is an embodiment in which the confirmation response is generated on the basis of the conversation history.

A specific example of the confirmation response generated by the response generating unit. 106 of the pre sent embodiment will be described with reference to FIG. 20.

Figure 20:
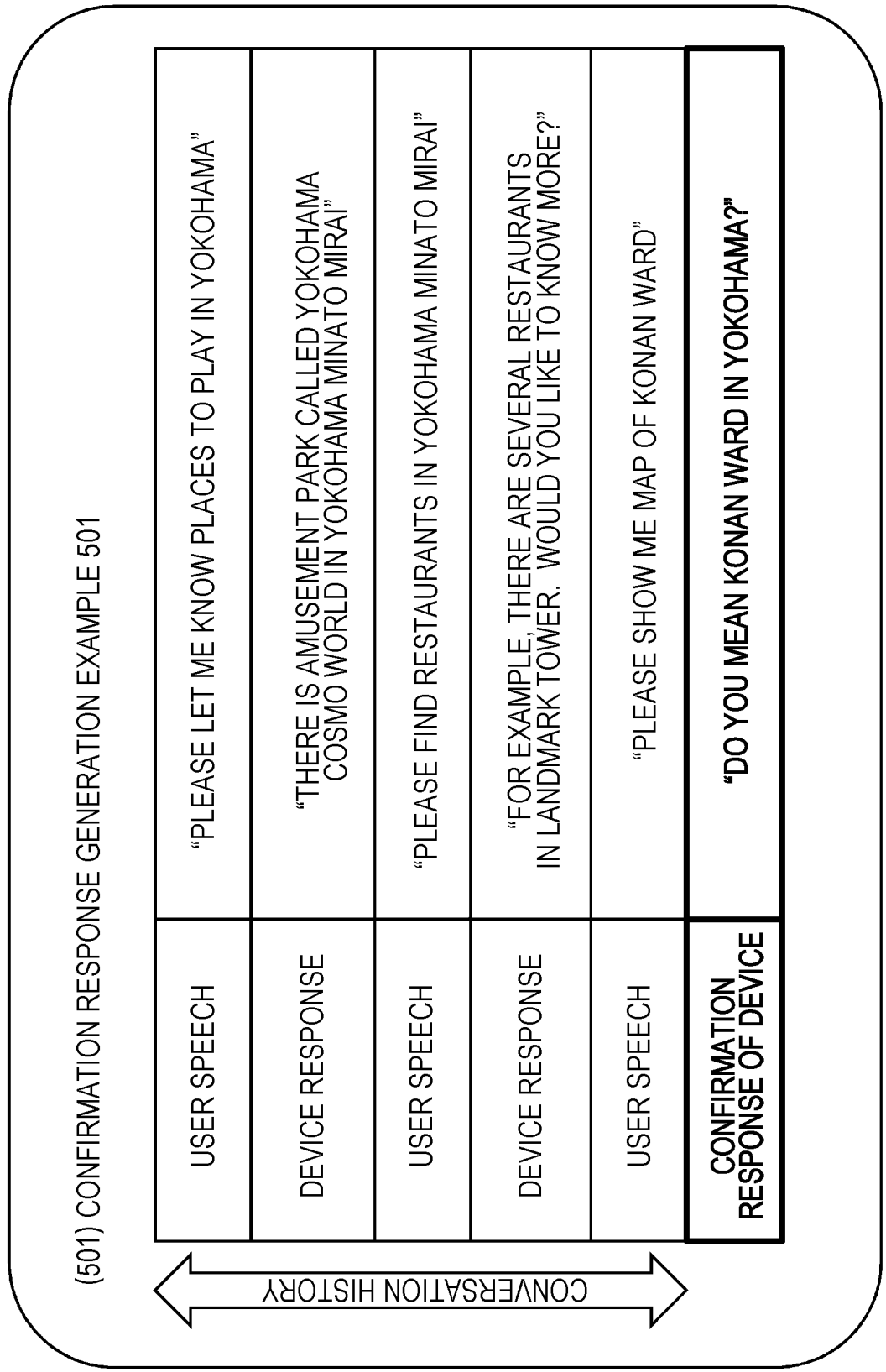
FIG. 20 is a diagram for describing a confirmation response generation example to which an information processing device of a fifth embodiment is applied.

FIG. 20 illustrates an example in which the following conversation is performed between the user and a device before the final confirmation response of the device.

User speech: "Please let me know places to play in Yokohama"

Device response: "There is amusement park called Yokohama cosmo world in Yokohama minato, mirai"

User speech: "Please find restaurants in Yokohama minato mirai"

Device response: "For example, there are several restaurants in landmark tower. Would you like to know more?"

User speech: "Please show me map of Konan ward"

Here, there are candidates such as Konan city in Aichi prefecture, Konan city in Kochi prefecture, Konan ward in Yokohama city, and Konan ward in Niigata city as the speech "Konan", and it is assumed that there is no certainty enough to decide uniquely.

However, the response generating unit 106 determines that it is likely to be Konan Ward in Yokohama City from the history because the conversation about Yokohama has continued before this speech.

Therefore, the response generating unit 106 generates and outputs the confirmation response with "in Yokohama", that is, the following confirmation response:

Device confirmation response: "Do you mean Konan ward in Yokohama?"

As additional information. (in Yokohama) based on such a conversation history is added and the confirmation response is given, the user can confirm that the device recognized the place correctly.

Incidentally, although the several examples of the configuration and the process of the information processing device of the present disclosure have been described with reference to FIGS. 2 to 20, each of the embodiments may be a configuration in which a plurality of arbitrary embodiments are combined. Further, as described below, the functions and the processes of the information processing device illustrated in FIG. 2 and the like can be distributed to a plurality of devices.

7. Configuration Example of Information Processing Device and Information Processing System Although a plurality of embodiments have been described, all the processing functions of the information processing device illustrated in FIG. 2 and the like described in these embodiments may be implemented in a single device, for example, a device such as a smartphone or a PC owned by the user, and some of them may be executed in a server or the like as well.

Figure 21:
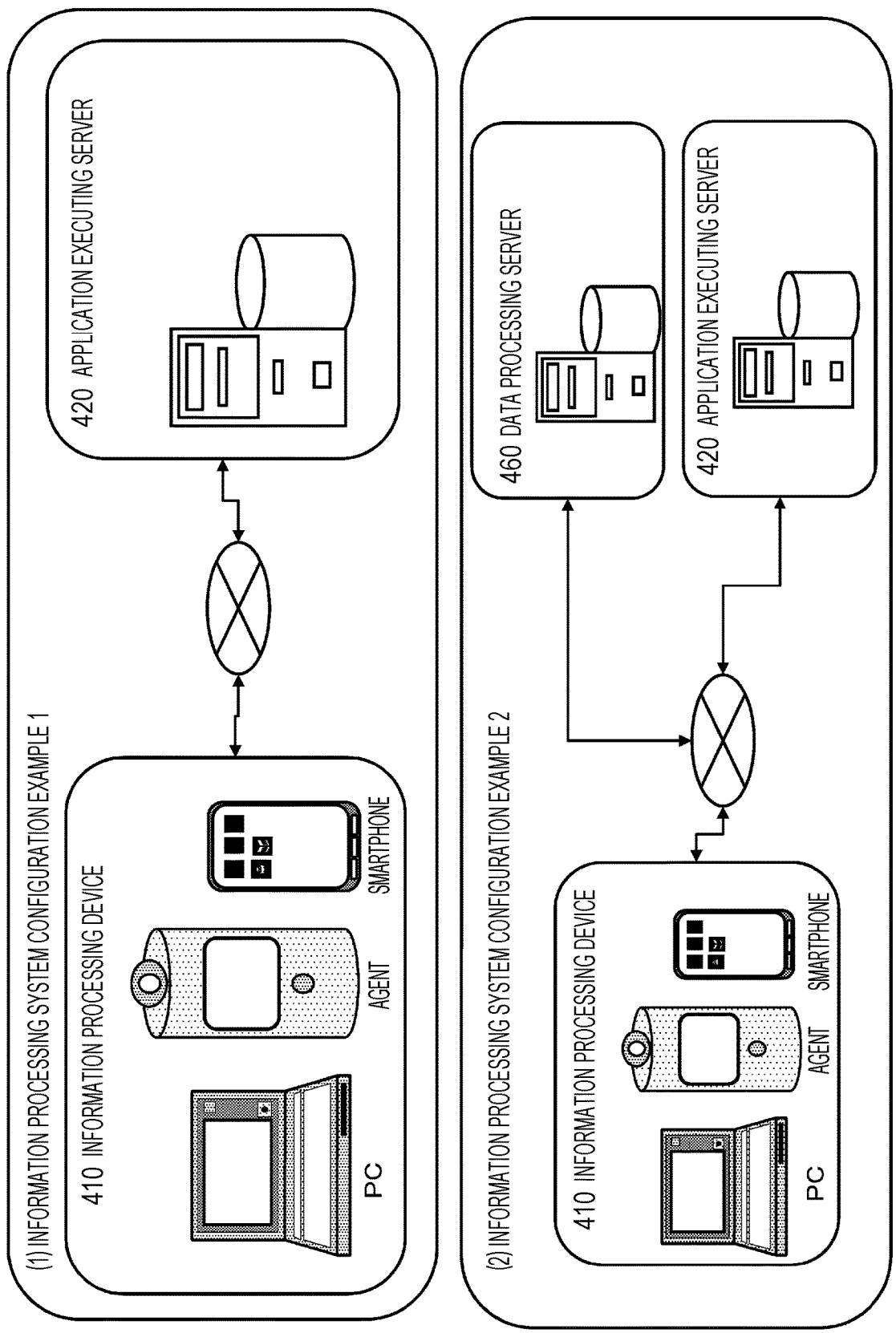
FIG. 21 is a diagram for describing a configuration example of an information processing system.

FIG. 21 illustrates a system configuration example.

(1) An information processing system configuration example 1 of FIG. 21 is an example in which substantially all the functions of the information processing device illustrated in FIG. 2 and the like are implemented in a single device, for example, an information processing device 410 which is a user terminal such as a smartphone or a PC owned by the user, or an agent device having an audio input/output function and an image input/output function.

The information processing device 410 corresponding to the user terminal executes communication with an application executing server 420, for example, only in a case in which an external application is used when the response sentence is Generated.

On the other hand, (2) an information processing system configuration example 2 of FIG. 21 is a system example in which some of the functions of the information processing device illustrated in FIG. 2 and the like are implemented in the information processing device 410 which is a user terminal such as a smartphone, a PC, an agent device, or the like owned by the user, and some functions are executed in a data processing server 460 capable of communicating with the information processing device.

For example, only the audio input unit 101 and the audio output unit 102 in the device illustrated in FIG. 2 or only the functions including the image input output unit or the response generating unit 106 therein may be installed in the information processing device 410 side of the user terminal side, and the other functions may be executed on the server side.

8. Hardware Configuration Example of Information Processing Device

Next, a hardware configuration example of the information processing device will be described with reference to FIG. 22.

Figure 22:
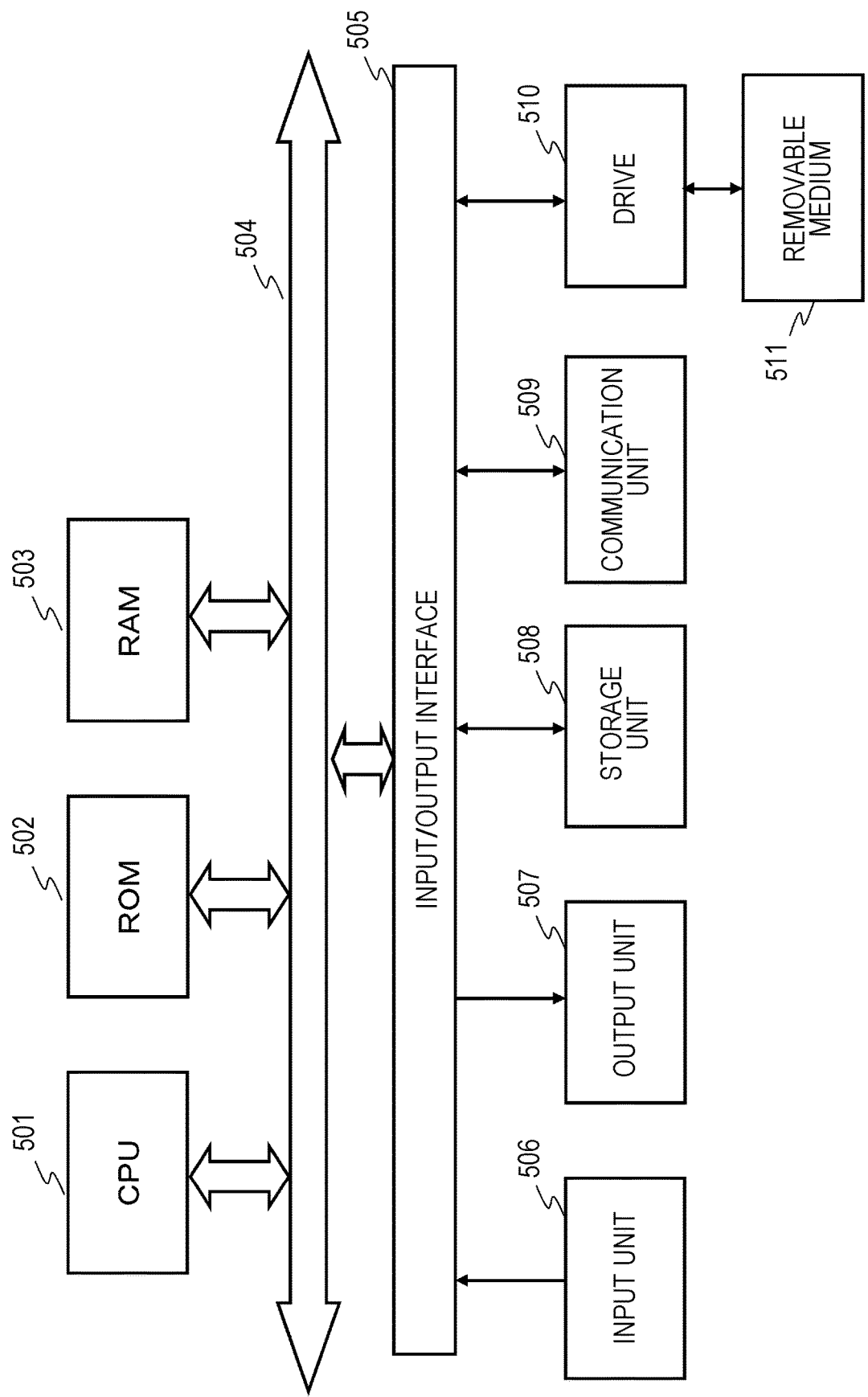
FIG. 22 is a diagram for describing a hardware configuration example of an information processing device.

Hardware described with reference to FIG. 22 is a hardware configuration example of the information processing device described above with reference to FIG. 2 and the like, and is a hardware configuration example of the information processing device constituting the data processing server 460 described with reference to FIG. 21.

A central processing unit (CPU) 501 functions as a control unit or data processing unit that executes various types of processes in accordance with a program stored in a read only memory (ROM) 502 or a storage unit 508. For example, the processes according to the sequences described in the above-described embodiments are executed. A random access memory (RAM) 503 stores a program executed by the CPU 501, data, and the like. The CPU 501, the ROM 502, and the RAM 503 are connected to one another via a bus 504.

The CPU 501 is connected to an input/output interface 505 via the bus 504, and an input unit 506 including various types of switches, a keyboard, a mouse, a microphone, a sensor, or the like and an output unit 507 including a display, a speaker, or the like are connected to the input/output interface 505. The CPU 501 executes various types of processes an response to a command input from the input unit 506, and outputs a process result to, for example, the output unit 507.

The storage unit 508 connected to the input/output interface 505 includes, for example, a hard disk, and stores a program executed by the CPU 501 or various types of data. A communication unit 509 functions as a transceiving unit of Wi-Fi communication, Bluetooth (registered trademark) (HT) communication, and data communication via a network such as the Internet or a local area network and communicates with an external device.

A drive 510 connected to the input/output interface 505 drives a removable medium 511 such as a magnetic disk, an opt disk, a magneto-optical disk, or a semiconductor memory such as a memory card, and executes recording or reading of data.

9. Conclusion of Configuration of the Present Disclosure

As described above, the embodiments of the present disclosure have been described in detail with reference to the specific examples. However, it is obvious that those skilled in the art can make modifications or substitutions to the embodiment within the scope of the present disclosure. In other words, the present invention has been disclosed in the form of exemplification, and should not be interpreted as limiting. In order to determine the gist of the present disclosure, claims set forth below should be taken into consideration.

Incidentally, the technology disclosed in this specification can have the following configurations.

(1) An information processing device, including:
an audio input unit that receives a user speech;
a confirmation response generating unit that generates a confirmation response for requesting confirmation of a speaking user to the user speech; and
an audio output unit that outputs the confirmation response generated by the confirmation response generating unit,
in which the confirmation response generating unit executes generation of a confirmation response using additional information acquired from at least any of dictionary data and an application execution result.

(2) The information processing device according to (1) in which the confirmation response generating unit executes the generation of the confirmation response using additional information configured with general knowledge obtained from general knowledge base dictionary data.

(3) The information processing device according to (2), in which the general knowledge is at least any of reading information with a date and calendar information.

(4) The information processing device according to (2), in which the general knowledge is at least any of history information and organization information.

(5) The information processing device according to any one of (1) to (4), in which the confirmation response generating unit executes the generation of the confirmation response using information obtained from an application executed in an application executing unit.

(6) The information processing device according to (5), in which the application executed in the application executing unit is a schedule registration application, and the confirmation response generating unit executes the generation of the confirmation response using schedule information of a speaking user obtained from the schedule registration application.

(7) The information processing device according to (5), in which the application executed in the application executing unit is an acquaintance registration application, and
the confirmation response generating unit executes the generation of the confirmation response using acquaintance information of a speaking user obtained from the acquaintance registration application.

(8) The information processing device according to any one of (1) to (7), further including,
an image input unit that captures a peripheral image of the speaking user or a sensor that inputs peripheral information of the speaking user, and
the confirmation response generating unit analyzes an input image from the image input unit or sensor detection information and generates a confirmation response using information obtained from an analysis result.

(9) The information processing device according to (8), n which the confirmation response generating unit identifies a person or an object included in the input image from the image input unit and generates a confirmation response using an identification result.

(10) The information processing device according to (8) or (9), in which the confirmation response generating unit identifies an attribute of a person included in the input image from the image input unit and executes the generation of the confirmation response corresponding to the identified attribute.

(11) The information processing device according to any one of (8) to (10), in which the confirmation response generating unit identifies an age of a person included in the input image from the image input unit and executes the generation of the confirmation response corresponding to the identified age.

(12) The information processing device according to any one of (8) to (11), in which the confirmation response generating unit identifies a configuration of the person included in the input image from the image input unit and executes the generation of the confirmation response corresponding to the identified configuration of the person.

(13) The information processing device according to any one of (1) to (12) in which the confirmation response generating unit generates an image for the confirmation response in conjunction with an audio output of the confirmation response and outputs the image to the image output unit.

(14) The information processing device according to any one of (1) to (13), in which the confirmation response generating unit generates a device control signal for the confirmation response in conjunction with an audio output of the confirmation response and outputs the device control signal to an external device to be controlled.

(15) The information processing device according to any one of (1) to (14), in which the confirmation response generating unit executes a confirmation response generation process based on conversation history information.

(16) The information processing device according to any one of (1) to (15), further including,
a voice recognizing unit that executes a recognition process of an input audio of the audio input unit;
an intention understanding unit that executes an intention understanding process based on a recognition result of the voice recognizing unit; and
a conversation control unit that executes a conversation control process based on an intention understanding result generated by the intention understanding unit,
in which the conversation control unit determines whether or not a confirmation response for requesting confirmation of a speaking user to the user speech is given on the basis of the intention understanding result generated by the intention understanding unit, and
the confirmation response generating unit executes a confirmation response generation process in a case in which the conversation control unit determines that the confirmation response is given.

(17) An information processing system, including:
a user terminal; and
a data processing server,
in which the user terminal includes
an audio input unit that receives a user speech,
a confirmation response generating unit that generates a confirmation response for requesting confirmation of a speaking user to the user speech, and an audio output unit that outputs the confirmation response generated by the confirmation response generating unit, the data processing server includes a voice recognizing unit that executes a recognition process of an input audio of the audio input unit, an intention understanding unit that executes an intention understanding process based on a recognition result of the voice recognizing unit, and a conversation control unit that executes a conversation control process based on an intention understanding result generated by the intention understanding unit, determines whether or not a confirmation response to the user speech is necessary on the basis of the intention understanding result, and outputs a confirmation response generation command to the confirmation response generating unit of the user terminal in a case in which t is determined that the confirmation response is necessary, and the confirmation response generating unit of the user terminal executes generation of a confirmation response using additional information acquired from at least any of dictionary data and an application execution result in accordance with an input of the confirmation response generation command from the data processing server.

(18) An information processing method executed in an information processing device, including:

an audio input step of receiving, by an audio input unit, a user speech;

a confirmation response generation step of generating, by a confirmation response generating unit, a confirmation response for requesting confirmation of a speaking user to the user speech; and an audio output step of outputting, by an audio output unit, the confirmation response generated in the confirmation response generation step, in which, in the confirmation response generation step, generation of a confirmation response using additional information acquired from at least any of dictionary data and an application execution result is executed.

(19) An information processing method executed in an information processing system including a user terminal and a data processing server, including:

executing, by the user terminal, an audio input process of receiving a user speech;

executing, by the data processing server, an audio recognition process of an input voice input in the audio input process;

executing, by the data processing server, an intention understanding process based on a voice recognition result generated in the voice recognition process;

determining, by the data processing server, whether or not a confirmation response to the user speech is necessary on the basis of an intention understanding result of the intention understanding process, and outputting a confirmation response generation command to the user terminal in a case in which it is determined that the confirmation response is necessary; and executing, by the user terminal, a confirmation: response generation process of generating a confirmation response for requesting confirmation of a speaking user to the user speech in accordance with an input of the confirmation response generation command from the data processing server, in which, in the confirmation response generation process, a confirmation response generation process using additional information obtained from at least any of dictionary data and an application execution result is executed.

(20) A program causing information processing to be executed in an information processing device, including:

an audio input step of causing an audio input unit to receive a user speech;

a confirmation response generation step of causing a confirmation response generating unit to generate a confirmation response for requesting confirmation of a speaking user to the user speech; and an audio output step of causing an audio output unit to output the confirmation response, in which, in the confirmation response generation step, generation of a confirmation response using additional information acquired from at least any of dictionary data and an application execution result is executed.

Further, a series of processes described in the specification can be performed by hardware, software, or a combination thereof. In a case in which a process by software is executed, a program having a process sequence recorded therein may be installed n a memory in a computer incorporated into dedicated hardware and executed, or the program may be installed in a general-purpose computer that can execute various types of processes and executed. For example, the program may be recorded in a recording medium in advance. The program may be installed in a computer from a recording medium, or the program may be received via a network such as a local area network (LAN) or the Internet and installed in a recording medium such as an internal hard disk.

Incidentally, various types of processes described in the specification may not only be executed chronologically in accordance with the description but also may be executed in parallel or individually depending on a processing capability of a device executing the process or if necessary. Further, in this specification, a term "system" refers to a logical aggregate configuration of a plurality of devices, and the devices of the respective configurations need not necessarily be installed in a same housing.

INDUSTRIAL APPLICABILITY

As described above, according to a configuration of one embodiment of the present disclosure, a configuration in which, when a confirmation response to a user speech is generated, a confirmation response capable of reducing a possibility of the occurrence of misunderstanding by adding additional information acquired from dictionary data or an application execution results is generated is implemented.

Specifically, for example, provided is an information processing device including an audio input unit that receives a user speech, a confirmation response generating unit That generates a confirmation response for requesting confirmation of a speaking user to the user speech, and an audio output unit that outputs the confirmation response generated by the confirmation response generating unit, in which the confirmation response generating unit executes generation of the confirmation response using additional information acquired from at least any of dictionary data and an application execution result. For example, the confirmation response is generated using general knowledge base dictionary data, an application execution result, or information obtained from a captured image, a sensor, or the like.

With this configuration, a configuration in which, when a confirmation response to a user speech is generated, a confirmation response capable of reducing a possibility of the occurrence of misunderstanding by adding additional information acquired from dictionary data or an application execution results is generated is implemented.

REFERENCE SIGNS LIST

100 Information processing device
101 Audio input unit (microphone)
102 Voice recognizing unit
103 Intention understanding unit
104 Conversation control unit
105 Application executing unit
106 Response generating unit
107 Audio output unit (speaker)
220, 240, 260, 280, 290, 310, 320 information processing device
221 General knowledge base dictionary data.
241 Application executing unit
261 image input unit (camera)
262 Image recognizing unit
263 Object (image) database
264 Object-related knowledge base dictionary data
281 Image input unit (camera)
282 User identifying unit
283 User image database
284 User information-related knowledge base dictionary data
291 Sensor
292 Sensor detection signal analyzing unit
293 Sensor detection information-related knowledge base dictionary data
311 image output unit (monitor)
321 External device
410 Information processing device
420 Application executing server
460 Data processing server
501 CPU
502 ROM
503 RAM
504 Bus
505 Input/output interface
506 input unit
507 Output unit
508 Storage unit
509 Communication unit
510 Drive
511 Removable medium

The invention claimed is:

1. An information processing device, comprising:
a microphone configured to receive a user speech;
a confirmation response generating unit configured to generate a confirmation response for requesting confirmation of a speaking user in response to the user speech; and
a speaker configured to output the confirmation response generated by the confirmation response generating unit,
wherein the confirmation response generating unit generates the confirmation response using additional information acquired from dictionary data and an application execution result,
wherein, when the user speech is determined to be ambiguous, the additional information acquired from the application execution result to generate the confirmation response includes registered schedule information of the speaking user that is registered in advance, and
wherein the confirmation response generating unit is implemented via at least one processor.

2. The information processing device according to claim 1,
wherein the confirmation response generating unit generates the confirmation response using additional information configured with general knowledge obtained from general knowledge base dictionary data.

3. The information processing device according to claim 2, wherein the general knowledge is at least any of reading information with a date and calendar information.

4. The information processing device according to claim 2, wherein the general knowledge is at least any of history information and organization information.

5. The information processing device according to claim 1,
wherein the confirmation response generating unit generates the confirmation response using information obtained from an application executed in an application executing unit, and
wherein the application executing unit is implemented via at least one processor.

6. The information processing device according to claim 5,
wherein the application executed in the application executing unit is a schedule registration application, and
the confirmation response generating unit generates the confirmation response using the registered schedule information of the speaking user obtained from the schedule registration application.

7. The information processing device according to claim 5,
wherein the application executed in the application executing unit is an acquaintance registration application, and
the confirmation response generating unit generates the confirmation response using acquaintance information of the speaking user obtained from the acquaintance registration application.

8. The information processing device according to claim 1, further comprising:
a camera configured to capture a peripheral image of the speaking user or a sensor configured to input peripheral information of the speaking user,
wherein the confirmation response generating unit is further configured to
analyze an input image from the camera or sensor detection information from the sensor, and
generate a confirmation response using information obtained from an analysis result.

9. The information processing device according to claim 8,
wherein the confirmation response generating unit is further configured to
identify a person or an object included in the input image from the camera, and
generate the confirmation response using an identification result of the person or the object included in the input image.

10. The information processing device according to claim 8,
wherein the confirmation response generating unit is further configured to
identify an attribute of a person included in the input image from the camera, and
execute the generation of the confirmation response corresponding to the identified attribute.

11. The information processing device according to claim 8,
wherein the confirmation response generating unit is further configured to
identify an age of a person included in the input image from the camera, and
execute the generation of the confirmation response corresponding to the identified age.

12. The information processing device according to claim 8,
wherein the confirmation response generating unit is further configured to
identify a configuration of the person included in the input image from the camera, and
execute the generation of the confirmation response corresponding to the identified configuration of the person.

13. The information processing device according to claim 1,
wherein the confirmation response generating unit generates an image for the confirmation response in conjunction with an audio output of the confirmation response and outputs the image to a screen.

14. The information processing device according to claim 1,
wherein the confirmation response generating unit generates a device control signal for the confirmation response in conjunction with an audio output of the confirmation response and outputs the device control signal to an external device to be controlled.

15. The information processing device according to claim 1,
wherein the confirmation response generating unit executes a confirmation response generation process based on conversation history information.

16. The information processing device according to claim 1, further comprising:
a voice recognizing unit that executes a recognition process of an input audio of the audio input unit;
an intention understanding unit that executes an intention understanding process based on a recognition result of the voice recognizing unit; and
a conversation control unit that executes a conversation control process based on an intention understanding result generated by the intention understanding unit,
wherein the conversation control unit determines whether or not the confirmation response for requesting confirmation of the speaking user in response to the user speech is given on a basis of the intention understanding result generated by the intention understanding unit,
wherein the confirmation response generating unit executes a confirmation response generation process in a case in which the conversation control unit determines that the confirmation response is given, and
wherein the voice recognizing unit, the intention understanding unit, and the conversation control unit are each implemented via at least one processor.

17. The information processing device according to claim 1,
wherein the user speech is determined to be ambiguous based on a determination that a reliability of voice recognition performed on the user speech is below a threshold reliability value.

18. An information processing system, comprising:
a user terminal; and
a data processing server,
wherein the user terminal includes
a microphone configured to receive a user speech,
a confirmation response generating unit configured to generate a confirmation response for requesting confirmation of a speaking user in response to the user speech, and
a speaker the confirmation response generated by the confirmation response generating unit,
wherein the data processing server includes
a voice recognizing unit that executes a recognition process of an input audio of the audio input unit,
an intention understanding unit that executes an intention understanding process based on a recognition result of the voice recognizing unit, and
a conversation control unit that executes a conversation control process based on an intention understanding result generated by the intention understanding unit, determines whether or not a confirmation response to the user speech is necessary on a basis of the intention understanding result, and outputs a confirmation response generation command to the confirmation response generating unit of the user terminal in a case in which it is determined that the confirmation response is necessary,
wherein the confirmation response generating unit of the user terminal generates the confirmation response using additional information acquired from dictionary data and an application execution result in accordance with an input of the confirmation response generation command from the data processing server,
wherein, when the user speech is determined to be ambiguous, the additional information acquired from the application execution result to generate the confirmation response includes registered schedule information of the speaking user that is registered in advance, and
wherein the confirmation response generating unit, the voice recognizing unit, the intention understanding unit, and the conversation control unit are each implemented via at least one processor.

19. An information processing method executed in an information processing device, comprising:
receiving, by a microphone, a user speech;
generating, by a confirmation response generating unit implemented via at least one processor, a confirmation response for requesting confirmation of a speaking user in response to the user speech; and
outputting, by a speaker, the generated confirmation response,
wherein the confirmation response is generated using additional information acquired from dictionary data and an application execution result is executed, and
wherein, when the user speech is determined to be ambiguous, the additional information acquired from the application execution result to generate the confirmation response includes registered schedule information of the speaking user that is registered in advance.

20. An information processing method executed in an information processing system including a user terminal and a data processing server, the method comprising:
executing, by the user terminal, an audio input process of receiving a user speech;
executing, by the data processing server, an audio recognition process of an input voice input in the audio input process;

executing, by the data processing server, an intention understanding process based on a voice recognition result generated in the voice recognition process;

determining, by the data processing server, whether or not a confirmation response to the user speech is necessary on a basis of an intention understanding result of the intention understanding process;

outputting a confirmation response generation command to the user terminal in a case in which it is determined that the confirmation response is necessary; and executing, by the user terminal, a confirmation response generation process of generating a confirmation response for requesting confirmation of a speaking user in response to the user speech in accordance with an input of the confirmation response generation command from the data processing server, wherein, in the confirmation response generation process, a confirmation response generation process using additional information obtained from dictionary data and an application execution result is executed, and wherein, when the user speech is determined to be ambiguous, the additional information acquired from the application execution result to generate the confirmation response includes registered schedule information of the speaking user that is registered in advance.

21. A non-transitory computer-readable storage medium having embodied thereon a program, which when executed by a computer of an information processing device causes the information processing device to execute a method, the method comprising:

causing a microphone to receive a user speech;

causing a confirmation response generating unit of the computer of the information processing device to generate a confirmation response for requesting confirmation of a speaking user in response to the user speech; and causing a speaker to output the confirmation response, wherein the confirmation response is generated using additional information acquired from dictionary data and an application execution result is executed, and wherein, when the user speech is determined to be ambiguous, the additional information acquired from the application execution result to generate the confirmation response includes registered schedule information of the speaking user that is registered in advance.

* * * * *